US012368177B2

(12) United States Patent
Vaid

(10) Patent No.: US 12,368,177 B2
(45) Date of Patent: Jul. 22, 2025

(54) FLOW BATTERIES WITH INSOLUBLE POLYMER SUPPORTED REDOX ACTIVE MATERIALS

(71) Applicant: REGENTS OF THE UNIVERSITY OF MICHIGAN, Ann Arbor, MI (US)

(72) Inventor: Thomas Vaid, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 131 days.

(21) Appl. No.: 17/961,831

(22) Filed: Oct. 7, 2022

(65) Prior Publication Data

US 2023/0122822 A1 Apr. 20, 2023

Related U.S. Application Data

(60) Provisional application No. 63/262,325, filed on Oct. 8, 2021.

(51) Int. Cl.
*H01M 8/18* (2006.01)
*H01M 8/023* (2016.01)

(52) U.S. Cl.
CPC ............. *H01M 8/18* (2013.01); *H01M 8/023* (2013.01)

(58) Field of Classification Search
CPC .......... Y02E 60/50; H01M 8/18; H01M 8/023
See application file for complete search history.

(56) References Cited

U.S. PATENT DOCUMENTS

2021/0273252 A1* 9/2021 Ito et al. ................ H01M 8/18
2023/0178784 A1* 6/2023 Sevov et al. ........... H01M 8/18

OTHER PUBLICATIONS

Duan et al., "Wine-Dark Sea" in an Organic Flow Battery: Storing Negative Charge in 2, 1,3-Benzothiadiazole Radicals Leads to Improved Cyclability, ACS Energy Lett., 2:1156-1161 (2017).
Duan, W., et al., A symmetric organic-based nonaqueous redox flow battery and its state of charge diagnostics by FTIR†, J. Mater. Chem. A, 4:5448-5456 (2016).
Hendriks, K. H., et al., High-Performance Oligomeric Catholytes for Effective Macromolecular Separation in Nonaqueous Redox Flow Batteries, ACS Cent. Sci., 4(2):189-196 (2018).
Hu et al., Long-Cycling Aqueous Organic Redox Flow Battery (AORFB) toward Sustainable and Safe Energy Storage, J. Am. Chem. Soc., 139:1207-1214 (2017).
Huang, Q., Reversible chemical delithiation/lithiation of LifePO4: towards a redox flow lithium-ion battery, Phys.Chem. Chem. Phys., 15:5 (1973).
Jennings, J. R., et al., Kinetics of LixFePO4 Lithiation/Delithiation by Ferrocene-Based Redox Mediators: An Electrochemical Approach, J. Phys. Chem. C, 119:17522-17528 (2015).
Jia, C., et al., High-energy density nonaqueous all redox flow lithium battery enabled with a polymeric membrane, Sci. Adv., 1:e1500886 (2015).

(Continued)

*Primary Examiner* — Haroon S. Sheikh
*Assistant Examiner* — Kan Luo
(74) *Attorney, Agent, or Firm* — MARSHALL, GERSTEIN & BORUN LLP

(57) ABSTRACT

A redox matched flow battery utilizes insoluble functionalized catholyte and anolyte beads to store charge on redox-active moieties tethered to the beads, with charge being transferred between the electrodes and the bead using a soluble, redox-matched mediator.

13 Claims, 34 Drawing Sheets

(56) References Cited

OTHER PUBLICATIONS

Kita et al., Hydrophilic Polymer Supports for Solid-Phase Synthesis: Preparation of Poly(ethylene glycol) Methacrylate Polymer Beads Using "Classical" Suspension Polymerization in Aqueous Medium and Their Application in the Solid-Phase Synthesis of Hydantoins, J. Comb. Chem., 3:564-571 (2001).
Kowalski J. A., et al., A Method for Evaluating Soluble Redox Couple Stability Using Microelectrode Voltammetry, Journal of The Electrochemical Society, 167:160513 (2020).
Liang, Z., et al., Comparison of Separators vs Membranes in Nonaqueous Redox Flow Battery Electrolytes Containing Small Molecule Active Materials, ACS Appl. Energy Mater., 4:5443-5451 (2021).
M. Darling et al., Pathways to low-cost electrochemical energy storage: a comparison of aqueous and nonaqueous flow batteries, Energy Environ. Sci., 7:3459-3477 (2014).
McElvan, S. M., et al., Piperidine Derivatives. XX. The Preparation and Reactions of 1-Methyl-3-piperidone, J. Am. Chem. Soc., 71(3): 896-900 (1949).
Moutet, J., et al., Symmetric, Robust, and High-Voltage Organic Redox Flow Battery Model Based on a Helical Carbenium Ion Electrolyte, ACS Appl. Energy Mater., 4(1):9-14 (2021).
Nchimi-Nono et al., Radical-Cation Dimerization Overwhelms Inclusion in [n]Pseudorotaxanes, Chem. Eur. J., 20:7334-7344 (2014).
Noack et al., The Chemistry of Redox-Flow Batteries, Angew. Chem. Int. Ed., 54:9776-9809 (2015).
Pan, F., et al., Redox Targeting of Anatase $TiO_2$ for Redox Flow Lithium-Ion Batteries, Adv. Energy Mater., 4:1-7 (2014).
Potash, R. A., et al., On the Benefits of a Symmetric Redox Flow Battery, Journal of The Electrochemical Society, 163(3):A338-A344 (2016).
Robinson et al., Developing a Predictive Solubility Model for Monomeric and Oligomeric Cyclopropenium-Based Flow Battery Catholytes, J. Am. Chem. Soc., 141:10171-10176 (2019).
Shrestha, A., et al., Realization of an Asymmetric Non-Aqueous Redox Flow Battery through Molecular Design to Minimize Active Species Crossover and Decomposition, Chemistry-A European Journal, 26:5369-5373 (2020).
Silcox et al., Transferability of Performance Metrics for Redox-Active Molecules, J. Phys. Chem. C., 123:16516-16524 (2019).
Ue et al., Electrochemical Properties of Organic Liquid Electrolytes Based on Quaternary Onium Salts for Electrical Double-Layer Capacitors, J. Electrochem. Soc., 141:2989-2996 (1994).
Vaid et al., An organic super-electron-donor as a high energy density negative electrolyte for nonaqueous flow batteries, Chem. Commun., 55:11037-11040 (2019).
Vaino, A. R., et al., Solid-Phase Organic Synthesis: A Critical Understanding of the Resin, J. Comb. Chem., 2:579-596 (2000).
Wang et al., Functionalized Cross-Linked Poly(vinyl alcohol) Resins as Reaction Scavengers and as Supports for Solid-Phase Organic Synthesis, J. Comb. Chem., 6:961-966 (2004).
Wang, Q., et al., Redox Targeting of Insulating Electrode Materials: A New Approach to High-Energy-Density Batteriest, Angew. Chem. Int. Ed., 118(48):8377-8380 (2006).
Winsberg et al., Redox-Flow Batteries: From Metals to Organic Redox-Active Materials, Angew. Chem. Int. Ed., 56:686-711 (2017).
Wong, C. M., et al., All-Organic Storage Solids and Redox Shuttles for Redox-Targeting Flow Batteries, ACS Energy Lett., 6:1271-1279 (2021).
Xiao et al., Revisiting the IspH Catalytic System in the Deoxyxylulose Phosphate Pathway: Achieving High Activity, J. Am. Chem. Soc., 131:9931-9933 (2009).
Xing et al., All-Liquid Electroactive Materials for High Energy Density Organic Flow Battery, ACS Appl. Energy Mater., 2:2364-2369 (2019).
Yan et al., Bis(diisopropylamino)cyclopropenium-arene Cations as High Oxidation Potential and High Stability Catholytes for Non-aqueous Redox Flow Batteries, J. Am. Chem. Soc., 142:17564-17571 (2020).
Yan et al., Mechanism-Based Design of a High-Potential Catholyte Enables a 3.2 V All-Organic Nonaqueous Redox Flow Battery, J. Am. Chem. Soc., 141:15301-15306 (2019).
Ye, J., et al., Redox targeting-based flow batteries, Journal of Physics D: Applied Physics, 52(44):18 (2019).
Yu, J., et al., A robust anionic sulfonated ferrocene derivative for pH-neutral aqueous flow battery, Energy Storage Materials, 29:216-222 (2020).
Zanzola, E., et al., Redox Solid Energy Boosters for Flow Batteries: Polyaniline as a Case Study, Electrochimica Acta, 235:664-671 (2017).
Zeng et al., A comparative study of all-vanadium and iron-chromium redox flow batteries for large-scale energy storage, J, Pow. Sour., 300:438-443 (2015).
Zhang et al., Solution Properties and Practical Limits of Concentrated Electrolytes for Nonaqueous Redox Flow Batteries, J. Phys. Chem. C., 122:8159-8172 (2018).
Zhou, M., et al., Nemstian-Potential-Driven Redox-Targeting Reactions of Battery Materials, Chem., 3(6):1036-1049 (2017).
Zhou, M., et al., Single-Molecule Redox-Targeting Reactions for a pH-Neutral Aqueous Organic Redox Flow Battery, Angew. Chem. Int. Ed., 59:14286-14291 (2020).
Zhu, Y. G., et al., Unleashing the Power and Energy of $LiFePO_4$-Based Redox Flow Lithium Battery with a Bifunctional Redox Mediator, J. Am. Chem. Soc., 139:6286-6289 (2017).

\* cited by examiner

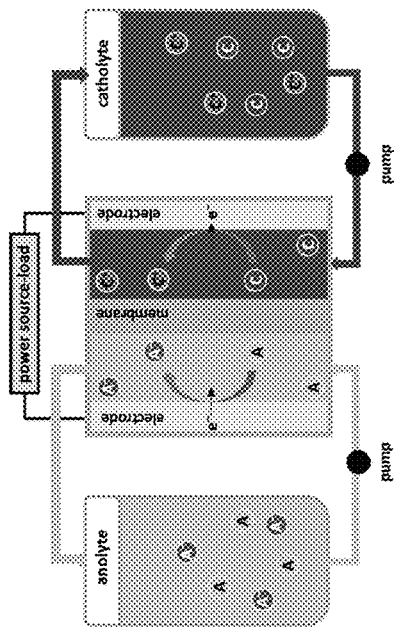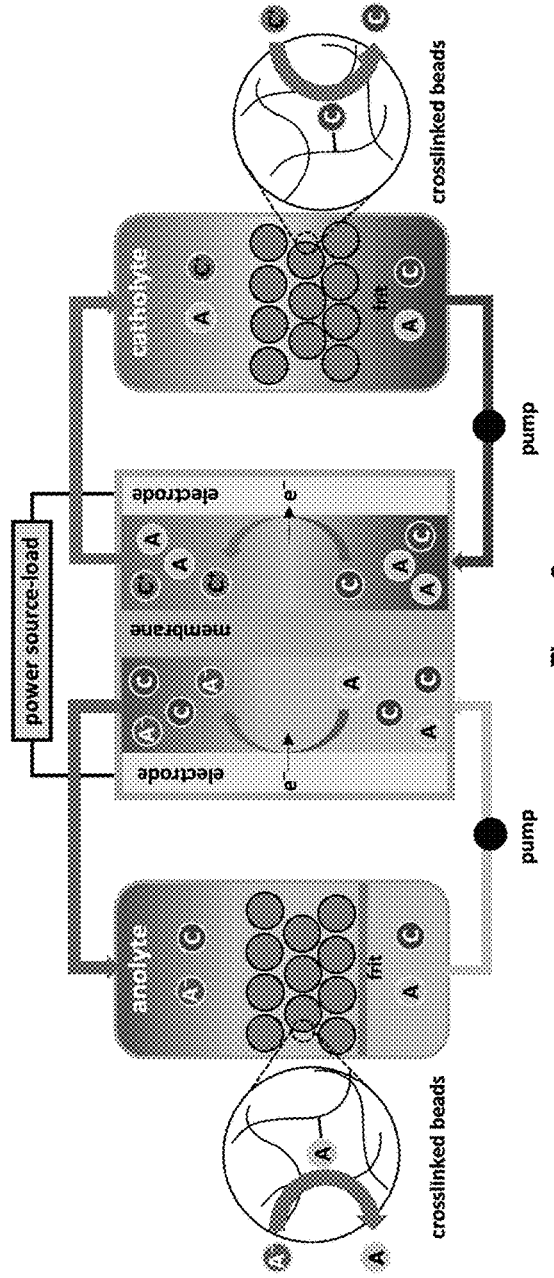

Redox-matched flowable mediators
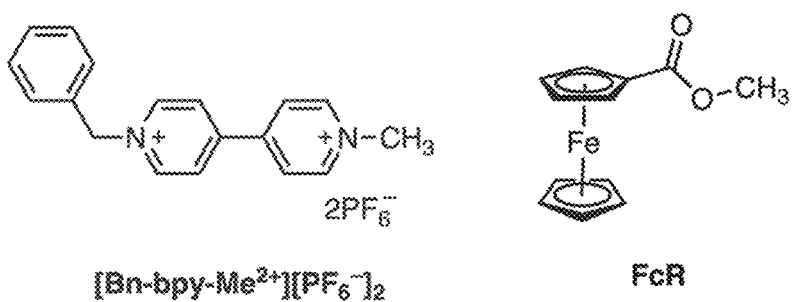
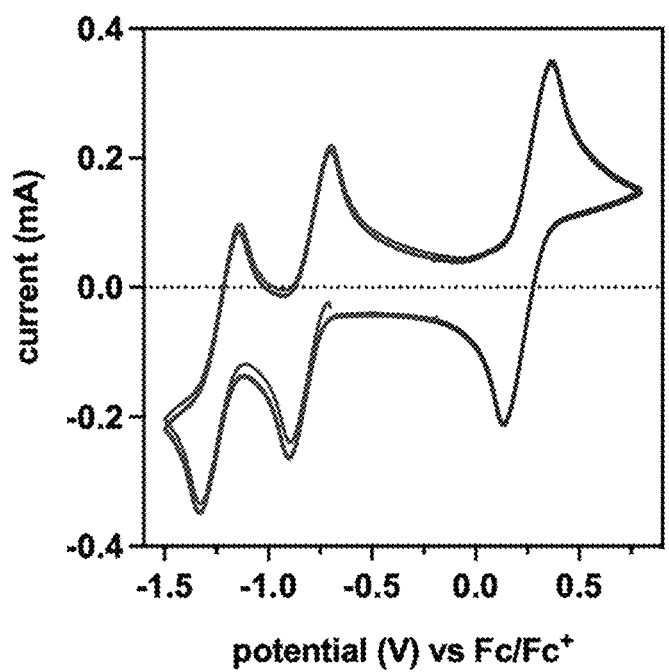
Figure 3B

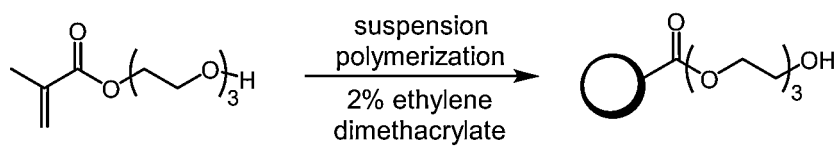
Figure 7A
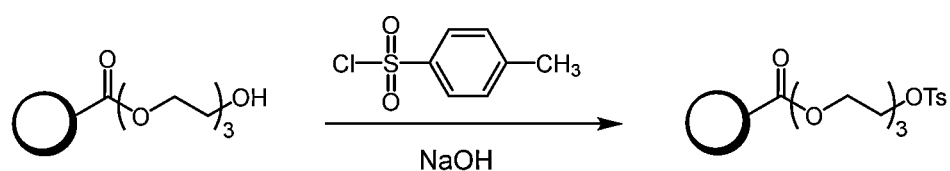
Figure 7B
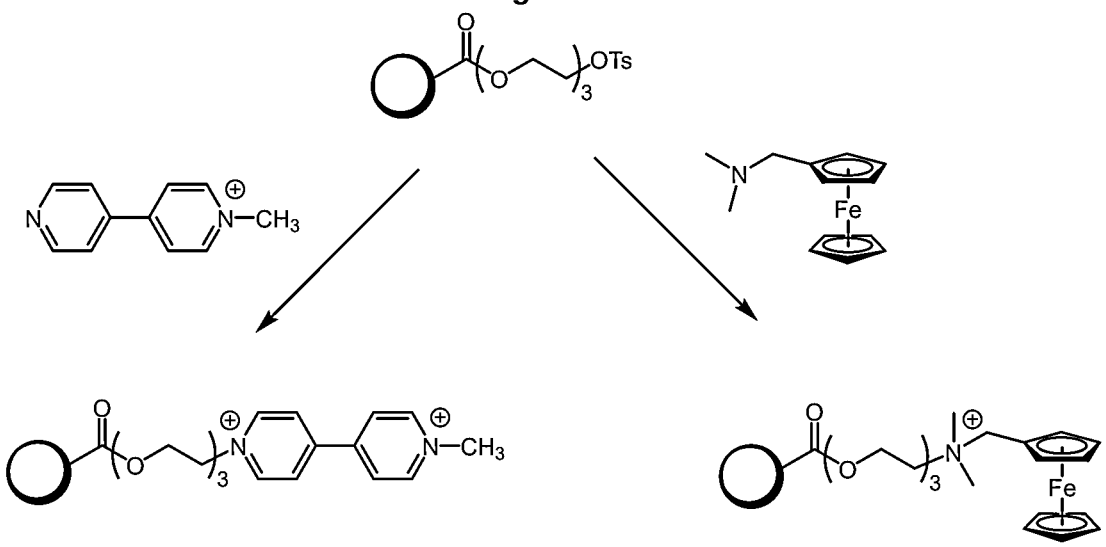
Figure 7C
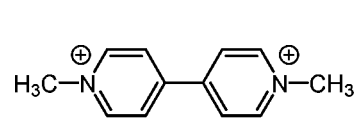 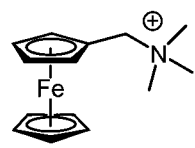
Figure 7D

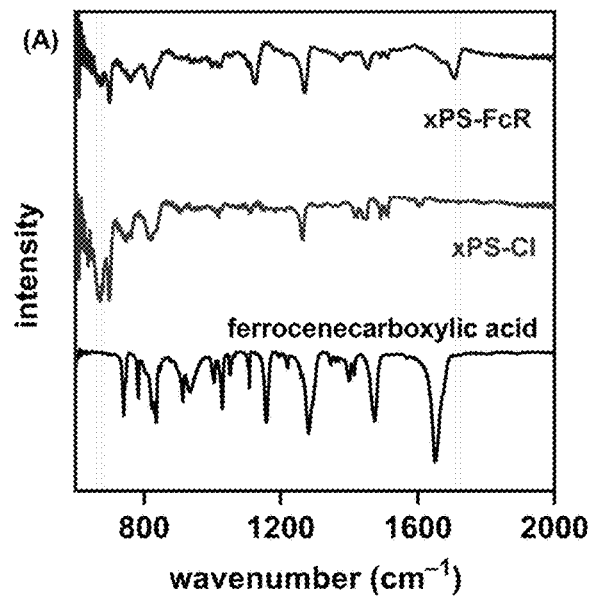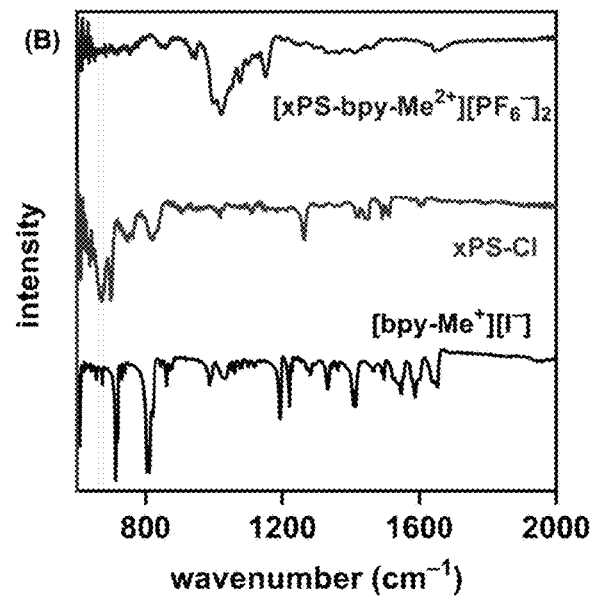
Figure 12A
Figure 12B
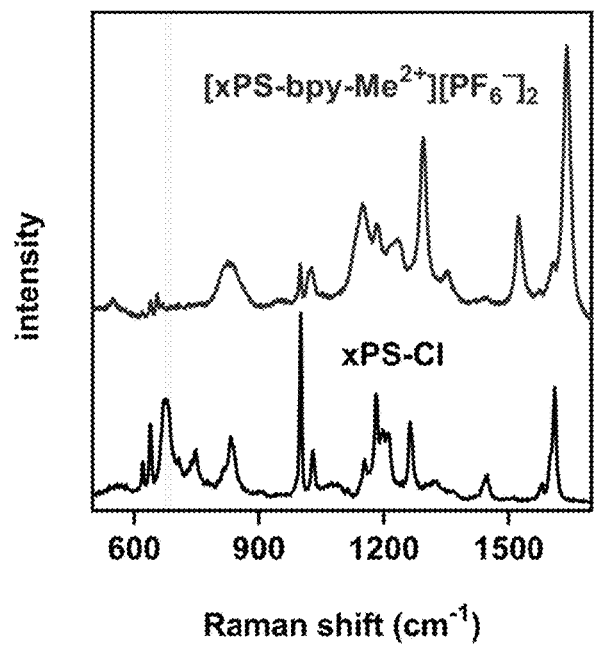
Figure 13 xPS-Cl    xPS-FcR orange beads
83% yield

FLOW BATTERIES WITH INSOLUBLE POLYMER SUPPORTED REDOX ACTIVE MATERIALS

CROSS-REFERENCE TO RELATED APPLICATION

The benefit of priority of U.S. Provisional Application No. 63/262,325 filed Oct. 8, 2021 is hereby claimed and the disclosure is incorporated herein by reference in its entirety.

STATEMENT OF GOVERNMENT SUPPORT

This invention was made with government support under DE-AC02-06CHI1357 awarded by the U.S. Department of Energy. The government has certain rights in the invention.

BACKGROUND

Field of the Disclosure

The disclosure relates to redox flow batteries with the main redox-active materials covalently attached to insoluble, crosslinked polymers.

Brief Description of Related Technology

As illustrated in FIG. 1A, in redox flow batteries, redox-active materials are dissolved in two separate solutions, the anolyte and catholyte, which flow past two closely-spaced electrodes where the electrochemical reactions take place. Because the anolyte and catholyte solutions are contained in external tanks, redox flow batteries can be scaled easily and inexpensively to store large amounts of energy, which is advantageous for renewable energy obtained from intermittent wind and solar sources. While high energy-storage capacity can be attained with large volumes of anolyte and catholyte solution, smaller volumes are preferable for practice and economic reasons. Energy density is directly proportional to the concentration of redox-active materials in solution. Redox-active organic molecules can be functionalized to create molecules with solubility of 1 M or greater. However, at concentrations near 1 M most redox-active organic molecules solutions become viscous and ionic conductivity decreases, rendering them less suitable for redox flow batteries.

Crossover of redox-active species between anolyte and catholyte solutions is another problem that must be addressed in redox flow batteries. Once a redox-active species has crossed over to the opposite electrolyte solution, it is no longer electrochemically active resulting in a loss in capacity for the redox flow battery. Symmetric redox flow batteries is one conventional means in which the crossover has been addressed. One way a symmetric redox flow battery is constructed is with the anolyte and catholyte containing the same redox-active element, as in the vanadium redox flow battery, which uses the $V^{2+/3+}$ couple in the anolyte solution and the $V^{4+/5+}$ couple in the catholyte solution. The vanadium ions that cross over will simply enter into the other redox reaction in the next cycled. The other way to create a symmetric redox flow battery is by using a 1:1 mixture of the positive and negative redox-active materials in both the anolyte and catholyte solutions, as is done in the iron-chromium aqueous redox flow battery wherein the positive redox couple is $Fe^{2+/3+}$ and the negative redox couple is $Cr^{2+/3+}$. In each solution only one ion participates in the battery charge and discharge ($Fe^{2+/3+}$ in the catholyte and $Cr^{2+/3+}$ in the anolyte) while the other ion is a spectator. While this configuration mitigates the negative effects of crossover, half of the active material is not used and is thus not an efficient use of the materials. Symmetric nonaqueous, organic redox flow batteries have been made by using redox-active organic molecules that can be both reversibly oxidized and reversible reduced as both the positive and negative redox-active organic molecule or by using a 1:1 mixture of two redox-active organic molecules in both the anolyte and the catholyte solutions, as in the iron-chromium redox flow battery.

In 2006, Wang et al introduced a systems in which an insoluble and poorly electrically conducting active materials such as $LiFePO_4$ is not in direct electrical contact with the current collector. Instead, two soluble redox-active molecules are in a solution that bathes the $LiFePO_4$. One of the soluble mediators has a redox potential about 0.1 V positive of $LiFe^{II}O_4/Fe^{III}PO_4$, and the other has a redox potential about 0.1 V negative of $LiFe^{II}O_4/Fe^{III}PO_4$. The $LiFePO_4$ is charged by oxidation by the more positive mediator, which in turn is oxidized at the electrode. Discharge happens similarly through reduction by the more negative mediator. If the $LiFePO_4$ were used as the positive active material in a flow battery, with the soluble molecular mediators circulating to the electrodes, and a similar setup were used for an insoluble negative active material, it would be possible to create a flow battery with high energy density, approaching that of a lithium-ion battery with the same active materials. One drawback of the system described by Wang and Grätzel is the use of two mediators for each electrode, which leads to a voltaic inefficiency, as charging happens through the higher potential mediator (for the positive electrode) and discharging through the lower potential mediator. In a full flow battery with four mediators (two for each electrode), each with a redox potential 0.1 V displaced from that of its electrode, there would be a 0.4 V difference between the charge and discharge voltage of the battery.

Recently, Sevov and Wong reported a redox-targeted electrode based on a crosslinked viologen polymer. Wong, C. M.; Sevov, C. S. All-Organic Storage Solids and Redox Shuttles for Redox-Targeting Flow Batteries. *ACS Energy Lett.* 2021, 6 (4), 1271-1279. https://doi.org/10.1021/acsenergylett.1c00143. The monomer bis(4-vinyl-benzyl) viologen was polymerized to form heavily cross-linked, insoluble beads that were used as the charge-storage material. Two mediators were used to charge and discharge the crosslinked viologen charge-storage material. This system experiences a loss in voltaic efficiency due to multiple mediators with different redox potentials, and required the synthesis of new polymers for each new solid redox-active material.

SUMMARY

A redox-matched flow battery in accordance with the disclosure can include an anolyte reservoir comprising anolyte beads immersed in an electrolyte solution; a catholyte reservoir comprising catholyte beads immersed in the electrolyte solution; and an electrochemical cell in fluid communication with the anolyte reservoir and the catholyte reservoir, the cell comprising an anode, a cathode, and a separator arranged between the anode and the cathode, defining an anolyte compartment between the separator and the anode and a catholyte compartment between the separator and the cathode, wherein the anolyte reservoir is in fluid communication with the anolyte compartment to circulate anolyte solution through the anolyte compartment and the catholyte reservoir is in fluid communication with the catholyte compartment to circulate catholyte solution through the catholyte compartment. The anolyte beads are insoluble polymer beads functionalized with a negative redox-active moiety. The catholyte beads are insoluble polymer beads functionalized with a positive redox-active moiety. The electrolyte solution comprises a first soluble mediator having a redox potential substantially the same as a redox potential of the negative redox-active moiety, and a second soluble mediator having a redox potential substantially the same as a redox potential of the positive redox-active moiety. In the anolyte reservoir, the first soluble mediator is adapted to undergo redox exchange with the negative redox-active moiety of the anolyte beads while the second soluble mediator remains inactive in the redox exchange. In the catholyte reservoir, the second soluble mediator is adapted to undergo redox exchange with the positive redox-active moiety while the first soluble mediator remains inactive in the redox exchange. The catholyte and anolyte beads are formed of a polymer that swells in the electrolyte solution.

BRIEF DESCRIPTION OF THE DRAWINGS

FIGS. 1A and 1B show conventional redox flow battery arrangements;

FIG. 2 is a schematic illustration of a redox-matched flow battery in accordance with the disclosure;

FIG. 3B is a cyclic voltammogram of a mixed solution of 5 mM of the functionalized beads and mediators of FIG. 3A in $CH_3CN$ with 0.50 M $[NBu_4]PF_6$ at a glassy carbon electrode;

FIGS. 7A-7C are schematic illustrations of synthesis of such hydrophilic polymers and their functionalization with a redox-active species;

FIG. 7D shows an example of soluble mediators that can be used with the anolyte and catholyte beads of FIG. 7C;

FIGS. 12A and 12B are graphs of IR spectra of (A) xPS-FcR, xPS-Cl and ferrocene carboxylic acid, and (B) [xPS-bpy-$Me^{2+}$][$PF_6^-$]$_2$, xPS-Cl, and [bpy-$Me^+$][$I^-$]. C—Cl band at 672 cm-1 and C=O band at 1714 cm-1;

FIG. 13 is a graph of Raman spectra of [xPS-bpy-$Me^{2+}$][$PF_6^-$]$_2$ and xPS-Cl. C—Cl band at 665 $cm^{-1}$;

DETAILED DESCRIPTION

Figure 3A:
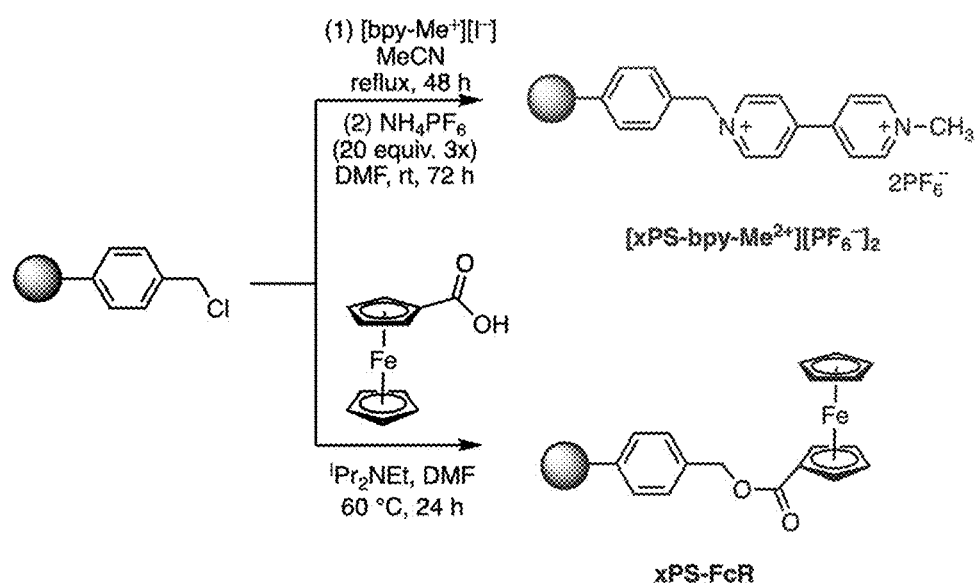
FIG. 3A is a schematic illustration of synthesis of two functionalized beads (top) and structures of the redox-matched mediators.

A redox-matched flow battery can include an anolyte reservoir comprising anolyte beads immersed in an electrolyte solution and a catholyte reservoir comprising catholyte bead immersed in the electrolyte solution. The battery further includes an electrochemical cell in fluid communication with the catholyte and anolyte reservoirs. The electrochemical cell includes a separator that divides the flow cell into an anolyte compartment and a catholyte compartment, an anode disposed in the anolyte compartment, and a cathode disposed in the catholyte compartment. For example, the anode and/or cathode can be spaced as distance from the respective side of the separator such that flow of electrolyte through the respective one of the anolyte compartment or catholyte compartment is between the anode or cathode and the separator. Alternatively, the flow cell can be a zero-gap cell in which the anode and cathode are pressed against opposed sides of the separator and flow of electrolyte in the respective anolyte or catholyte compartment is between the anode or cathode and the outer wall of the flow cell.

The battery operates such that electrolyte from the catholyte reservoir is circulated through the catholyte compartment and electrolyte from the anolyte reservoir is circulated through the anolyte compartment. The catholyte and anolyte beads each include an insoluble polymer functionalized with a redox-active moiety. The electrolyte solution comprises first and second soluble mediators that have the same or substantially the same redox potential as the respective redox-active moiety of the anolyte and catholyte beads. That is, the redox potentials of the soluble mediators are matched to the redox-active moiety. For example, the anolyte beads can have a negative redox-active moiety and the first soluble mediator can have a redox potential matched to the negative redox-active moiety. The catholyte bead can have a positive redox-active moiety and the second soluble mediator can have a redox potential matched to the positive redox-active moiety. During operation, the catholyte and anolyte bead swell in the electrolyte.

Each of the beads includes a redox-active molecules covalently tethered to insoluble polymer beads. The polymer beads can act as charge-storage material. For each of the catholyte and anolyte bead types, the matched soluble molecular mediator can have a chemical structure similar to the redox-active moiety on the bead as well as with the redox potentials are substantially the same.

In contrast to prior work such as illustrated in FIG. 1B, the redox-matched flow batteries of the disclosure have only one mediator for each insoluble redox-active material and charging/discharging is driven by the Nernstian potential difference due to the different ratio of oxidized/reduced species in solution versus on the bead.

As shown in FIG. 2, the soluble mediator circulates through the flow battery and is oxidized/reduced at the electrode, then flows past the polymer beads in the reservoir and undergoes redox exchange with the active moieties on the beads. In FIG. 2, the anolyte mediators (and moieties on the anolyte beads) are labeled A and the catholyte mediators (and moieties on the catholyte beads) are labeled C. The flow rate of the electrolyte solution through the battery can be adjusted based on the size and arrangement of the battery. For example, a flow rate of about 5 ml/min to about 25 ml/min could be used. However, other flow rates are also contemplated herein.

The soluble species that is in the "wrong" solution merely acts as a spectator and is not involved in the redox reactions at either the electrode or the beads. That is, the second soluble mediator remains inactive when circulating through the anolyte side of the battery, and the first soluble mediator remains inactive when circulating through the catholyte side of the batter. For example, a viologen in the catholyte solution would remain a di-cation as the ferrocene derivative is cycled between its neutral and +1 state. Because the vast majority of charge is stored in the beads, only a small fraction of the viable active material is unused, unlike the iron-chromium RFB where half of the active material is unused. In batteries of the disclosure, the effective concentration of active material can be 1 M or more after swelling of the beads with electrolyte and/or solvent therein. Yet the dissolved mediators can be at relatively low concentration, in the range of 25 mM or less. Consequently, the soluble species do not need to be engineered for high solubility, and the problems of high-concentration solutions, such as high viscosity, are avoided. In addition, it is not necessary to functionalize the soluble mediators to minimize crossover.

The anolyte beads reside in the anolyte reservoir and the catholyte beads reside in the catholyte reservoir. Each reservoir includes a porous divider upon which the beads can rest.

The porous divider can allow the electrolyte solution to pass through to allow the solution to be recirculated into the flow cell from a bottom of the reservoirs after undergoing redox exchange with the redox-active moiety on the polymer beads. The circulation can include flow from the cell going back into the reservoir in a region above the beads. Other arrangements can be contemplated herein. Any suitable porous divider can be used. For example, the porous divider can be a porous glass frit.

In some batteries of the disclosure, the electrolyte solution can contain a concentration of each of the mediators such that there is a 1:1 mixture of the first and second soluble mediators. Use of a 1:1 mixture of soluble species can be advantageous to mitigate the negative effect of crossover of the mediators through the separator. Other mixtures of the soluble mediators are also contemplated herein.

The catholyte beads and anolyte beads can include any suitable insoluble polymer material that is capable of swelling in the electrolyte solution and has a leaving group to which the redox-active moiety can be attached. For example, the polymer can have a leaving group such as chloromethyl groups that allows for nucleophilic displacement, or various functionalities that allow for click reactions. Initial concentration of the leaving group, such as the —$CH_2Cl$ functionality, of the polymer beads can be about 4 M. For example, the polymer beads can comprise polystyrene. For example, the polymer beads can be poly(chloromethylstyrene-co-styrene-co-divinylbenzene). Other suitable known materials can be used, such as described in Vaino & Janda, *Solid-Phase Organic Synthesis: A Critical Understanding of the Resin,* 2, J. Comb. Chem. 579-96 (2000).

Hydrophilic polymer beads can be used with aqueous electrolyte solutions. Several types of hydrophilic cross-linked polymer beads with pendant groups amenable to functionalization have been reported and can be used as the polymer beads in the batteries herein. Kita, R.; Svec, F.; Fréchet, J. M. J. Hydrophilic Polymer Supports for Solid-Phase Synthesis: Preparation of Poly(Ethylene Glycol) Methacrylate Polymer Beads Using "Classical" Suspension Polymerization in Aqueous Medium and Their Application in the Solid-Phase Synthesis of Hydantoins. J. Comb. Chem. 2001, 3 (6), 564-571. https://doi.org/10.1021/cc010020c; and Wang, Z.; Luo, J.; Zhu, X. X.; Jin, S.; Tomaszewski, M. J. Functionalized Cross-Linked Poly(Vinyl Alcohol) Resins as Reaction Scavengers and as Supports for Solid-Phase Organic Synthesis. J. Comb. Chem. 2004, 6 (6), 961-966. https://doi.org/10.1021/cc0499183. For example, a methacrylate monomer with a short poly(ethylene glycol) chain can be polymerized to yield hydrophilic polymer beads with reactive alcohol functionalities. Reaction with p-toluenesulfonyl chloride yields the tosylate, which can be easily displaced by a variety of nucleophiles to form the linkage with the redox-active moiety. FIGS. 7A-7C are schematic illustrations of synthesis of such hydrophilic polymers and their functionalization with a redox-active species. FIG. 7D shows an example of soluble mediators that can be used with the anolyte and catholyte beads of FIG. 7C. These mediators are known to be functional in an aqueous redox flow batter with high cycling stability. Hu, B.; DeBruler, C.; Rhodes, Z.; Liu, T. L. Long-Cycling Aqueous Organic Redox Flow Battery (AORFB) toward Sustainable and Safe Energy Storage. *J. Am. Chem. Soc.* 2017, 139 (3), 1207-1214. https://doi.org/10.1021/jacs.6b10984.Viologen and ferrocene are shown by way of example and illustration only. Any other suitable redox-active moieties could be used as described herein.

Various redox-active molecules can be used as the redox-active moieties attached to the polymer beads and the first and second soluble mediators. Any known redox-active materials can be used, such as described in Luo et al., *Status and Prospects of Organic Redox Flow Batteries towards Sustainable Energy Storage,* 4, ACS Energy Lett. 2220-40 (2019); Rhodes et al., *Electrochemical Advances in Non-Aqueous Redox Flow Batteries,* 60, Isr. J. Chem 1-13 (2020); and Li et al., *Recent Advancements in Rational Design of Non-Aqueous Organic Redox Flow Batteries,* 4, Sustainable Energy Fuels, 4370 (2020). Use of structurally similar redox-active molecules for the redox-active moieties attached to the bead and the respective soluble mediator can facilitate matching redox potentials. However, structurally different molecules can be used if the redox potentials are the same or substantially the same.

Redox potentials between the redox active moiety on the polymer bead and the soluble mediator can have a difference of about 10 mV or less and be considered matched. For example, viologen and/or derivatives thereof can be used as the negative redox active moiety and/or the first soluble mediator. For example, the viologen can be [Bn-bpy-Me$^{2+}$][PF$_6^-$]$_2$.

Ferrocene and cyclopropenium are non-limiting examples of positive redox active molecules which can be used. For example, the ferrocene can be methyl ferrocenecarboxylate. For example, the cyclopropenium can be tris(dialkylamino) cyclopropenium. For example, the tris(dialkylamino)cyclopropenium can be bis(diisopropylamino)dialkylaminocyclopropenium Batteries of the disclosure can be charged to about 1 V to about 3 V, about 1 V to about 2.5 V, about 1.5 V to about 2 V, or any values or ranges there between. Voltage can be tuned by the difference in redox potentials between the redox-active molecules used. For example, a viologen/ferrocene containing battery as described in the example was found to charge to 1.04 V. It is believed that use of viologen and cyclopropenium in the batteries of the disclosure could increase the charge to 1.6 V.

EXAMPLES

Materials 4,4'-Dipyridyl, iodomethane, benzyl bromide, ammonium hexafluorophosphate ($NH_4PF_6$), ferrocene carboxylic acid, diisopropylethylamine, and silver hexafluorophosphate were purchased from Sigma Aldrich and used without further purification. Methyl ferrocenecarboxylate (FcR) was purchased from Ambeed and used after sublimation. Merrifield resin (poly(chloromethylstyrene-co-styrene-co-divinylbenzene) (200-400 mesh, 3.5-4.5 mmol/g $Cl^-$, 1% cross-linked) (xPS-Cl) was purchased from Sigma Aldrich. Dichloromethane (DCM), ethyl acetate (EtOAc), methanol (MeOH), acetonitrile (MeCN), dimethylformamide (DMF), and diethyl ether ($Et_2O$) were purchased from Sigma Aldrich or Fisher and used without purification.

Merrifield resin consists of crosslinked polystyrene with chloromethyl functionalities, were used as the polymer beads. Merrifield resin is commercially available as beads in a variety of sizes, degrees of crosslinking, and degrees of chloromethyl functionalization. The chloromethyl groups provided a handle for covalent attachment of organic moieties. Beads containing 4.2 mmol of chlorine per gram (determined by elemental analysis (EA) of C, H, and Cl) were used, which translates to a concentration of over 4 M of chlorine in the dry, unfunctionalized beads. When the chlorine was substituted by the redox-active groups, the volume of the beads increases, and the necessary swelling of the beads by solvent further increased their volume. 4 M was an encouragingly high initial effective concentration of active material.

Materials Characterization

NMR SPECTROSCOPY—$^1H$ and $^{11}C$ NMR spectra for all compounds were acquired at rt. Chemical shift data are reported in units of δ (ppm) relative to tetramethylsilane (TMS) and referenced with residual solvent. Multiplicities are reported as follows: singlet (s), doublet (d), doublet of doublets (dd), triplet (t), quartet (q), multiplet (m).

ELEMENT ANALYSIS (EA)—EA was performed by Midwest Microlab. EA for xPS-Cl was C: 78.27%, H: 6.66%, Cl: 14.87%, indicating that 1 g of xPS-Cl has 4.2 mmol of Cl. This number was used for further measurements of functionalized beads.

INFRARED SPECTROSCOPY (IR)—IR data were recorded using a Thermo Scientific Nicolet IS50 FT-IR spectrometer.

RAMAN SPECTROSCOPY—Raman data were recorded using a Renishaw inVia Raman microscope equipped with a RenCam CCD detector, a 785 nm diode laser, 1200 lines/mm grating, and a 65 μm slit. Spectra were analyzed using the WiRE 3.4 software package and calibrated using a silicon standard.

SWELLING MEASUREMENT—OPTICAL MICROSCOPY—Before measurements, the beads were dried under vacuum. The crosslinked polymer beads were soaked in MeCN or DMF for 60 min then examined while still in the solvent, using a microscope slide and a cover slip to contain the solvent, using a Leica DMCB optical microscope with a 10× objective lens. Images were recorded with an attached QICAM Fast 1394 digital video camera. Similar images of pristine beads were collected. The average diameter was calculated by ImageJ from over 300 beads before and after soaking.

SWELLING MEASUREMENT—VOLUMETRIC CHANGE—In an NMR tube, a precisely measured mass (~100 mg) of polymer beads was added, and the height was measured and used for calculating the volume change upon swelling using conversion factor 1 cm height=130 μL. The height of the beads was recorded before and after soaking in MeCN or DMF for 60 min. Swelling data is shown in Table 1.

Synthetic Procedures

The starting Merrifield resin beads (xPS-Cl) were functionalized with viologen groups to create the negative active material and with ferrocene or cyclopropenium groups for the positive active material. FIG. 3A shows a one-step substitute reaction for functionalization.

Referring to FIG. 3A, treatment of xPS-Cl with 1-methyl-4,4'-bipyridinium iodide in MeCN at reflux for 48 h yielded viologen-functionalized beads as the mixed chloride-iodide salt, [xPS-bpy-$Me^{2+}$][$Cl^-$][$I^-$]. Reaction completion was confirmed by disappearance of the C—Cl band in the Raman spectrum at 665 cm 1 and in the IR spectrum at 672 cm-1 (see FIGS. 12 and 13 for spectra). Three rounds of ion exchange with NH4PF6 yielded the viologen-functionalized beads as the hexafluorophosphate salt, [xPS-bpy-$Me^{2+}$][$PF_6^-$]$_2$. Both the initial [xPS-bpy-$Me^{2+}$][Cl–][I] beads and the ion-exchanged beads, [xPS-bpy-$Me^{2+}$][$PF_6^-$]$_2$, were examined by EA for C, H, N, Cl, and I, and the [xPS-bpy-$Me^{2+}$][$PF_6^-$]$_2$ beads were additionally analyzed for F content. There was no fractional conversion to [xPS-bpy-$Me^{2+}$][$Cl^-$][$I^-$] and fractional ion-exchange to [xPS-bpy-$Me^{2+}$][$PF_6^-$]$_2$ that was consistent with the EA for both sets of beads. However, an assumption of 75% conversion in the initial functionalization reaction to create [xPS-bpy-$Me^{2+}$][$Cl^-$][$I^-$], followed by 95% ion exchange to give [xPS-bpy-$Me^{2+}$][$PF_6^-$]$_2$, gives a calculated EA that agreed reasonably well with the experimental EA mass % for N (3.80 calc, 3.44 exp), Cl (1.84 calc, 1.69 exp), and I (0.86 calc, 0.93 exp).

Referring again to FIG. 3A, the ferrocene-functionalized beads were synthesized by the reaction of xPS-Cl with ferrocenecarboxylic acid and $iPr_2NEt$ in DMF at 60° C. for 24 h, yielding xPS-Fc. Raman spectroscopy of the ferrocene beads was not possible due to fluorescence of the ferrocene functionalities. Instead, reaction progress/completion was checked by IR spectroscopy. The C—Cl band at 672 cm-1 disappeared after re-action, and a C=O band at 1714 cm-1 due to the ester link-age appeared. Elemental analysis for C, H, N, and Cl agreed most closely with conversion of 70% of the chloromethyl functionalities to ferrocene functionalities, and with 0.16 equiv of residual DMF per monomer unit (of any kind).

The soluble mediators, shown in FIG. 3A, were chosen to have structures analogous to the redox-active moieties on the polymer beads, such that their redox potentials would be very similar. Cyclic voltammetry ($CH_3CN$, 0.50 M [$NBu_4$][$PF_6$]) showed that the ferrocene mediator, FcR, has an $E_{1/2}$=+0.255 V (vs ferrocene$^{+/0}$), while the viologen mediator [Bn-bpy-$Me^{2+}$][$PF_6^-$]$_2$ has $E_{1/2}$=−0.785 V and −1.204 V (vs ferrocene$^{+/0}$). Only the first viologen reduction was used in the RMFB, affording a nominal voltage of 1.04 V.

Additional synthesis details and schemes are provided below

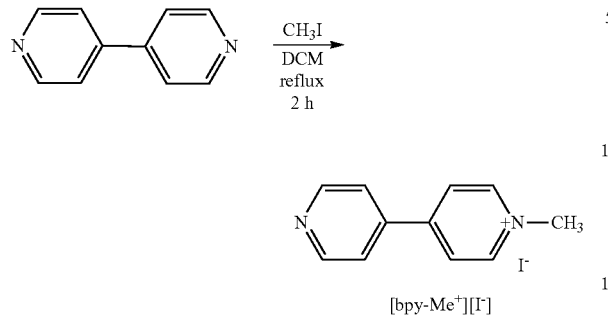

[bpy-Me⁺][I⁻]

Figures 8A, 8B:
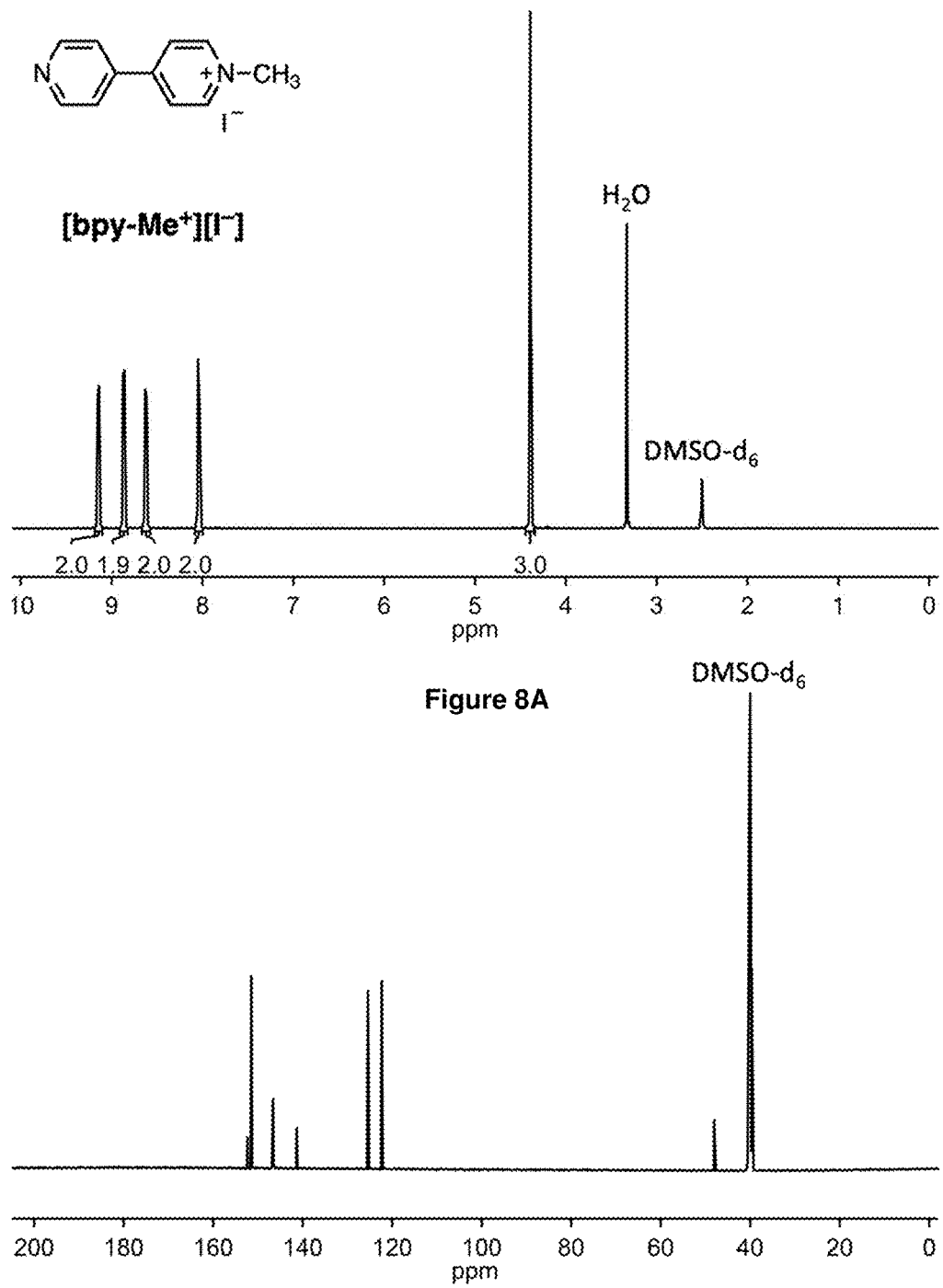
FIG. 8A is an $^1H$ NMR Spectra of [bpy-$Me^+$][$I^-$]
FIG. 8B is a $^{13}C$ NMR Spectra of [bpy-$Me^+$][$I^-$]

Synthesis of [bpy-Me⁺][I⁻]. In an oven-dried 100 ml round-bottom flask, a mixture of 4,4-dipyridyl (784 mg, 5.02 mmol) and iodomethane (0.41 mL, 6.6 mmol, 1.3 equiv.) in DCM (10 mL) was stirred at reflux under $N_2$ for 2 h, during which time a yellow precipitate formed. After cooling to rt, the yellow precipitate was collected and washed with EtOAc (2×50 mL) and $Et_2O$ (2×50 mL). The solid was recrystallized from MeOH to yield [bpy-Me⁺][I⁻] as a yellow powder (1.13 g, 75% yield). Referring to FIG. 8, ¹H NMR (401 MHz, DMSO-$d_6$) δ 9.15 (d, J=6.5 Hz, 2H), 8.91-8.82 (m, 2H), 8.67-8.58 (m, 2H), 8.08-8.00 (m, 2H), 4.39 (s, 3H). ¹³C NMR (126 MHz, DMSO-$d_6$) δ 152.29, 151.48, 146.61, 141.29, 125.40, 122.32, 48.05.

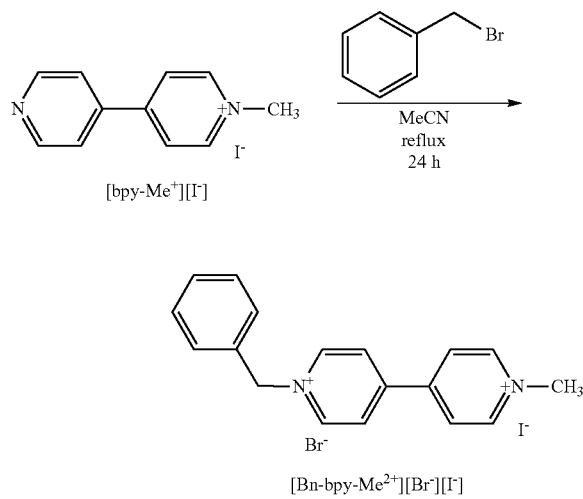

Figure 9A:
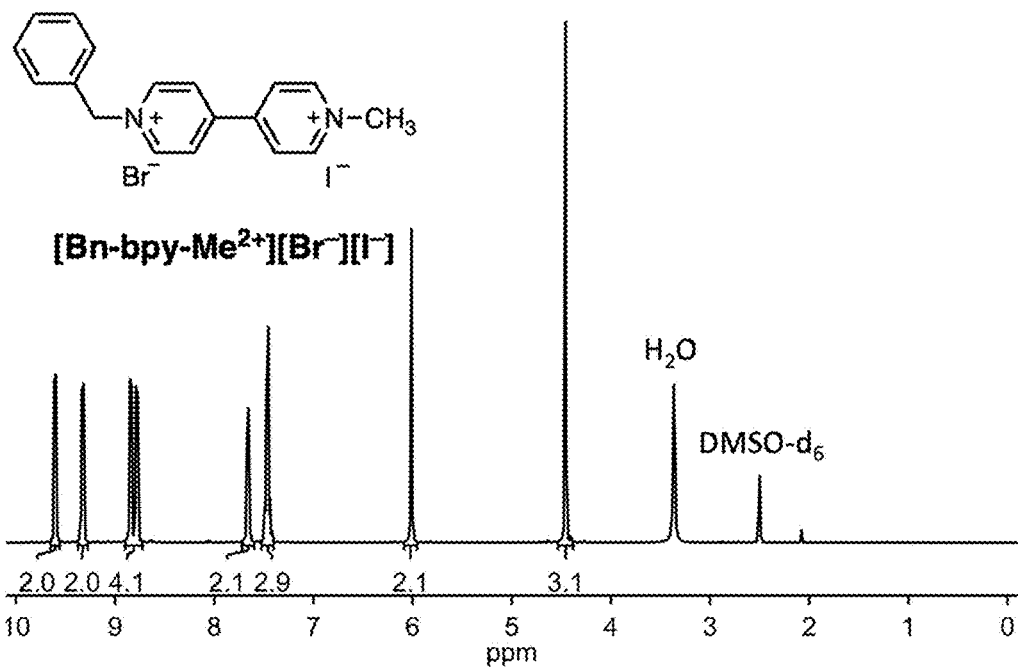
FIG. 9A is an $^1H$ NMR Spectra of [Bn-bpy-$Me^{2+}$][$Br^-$][$I^-$]
Figure 9B:
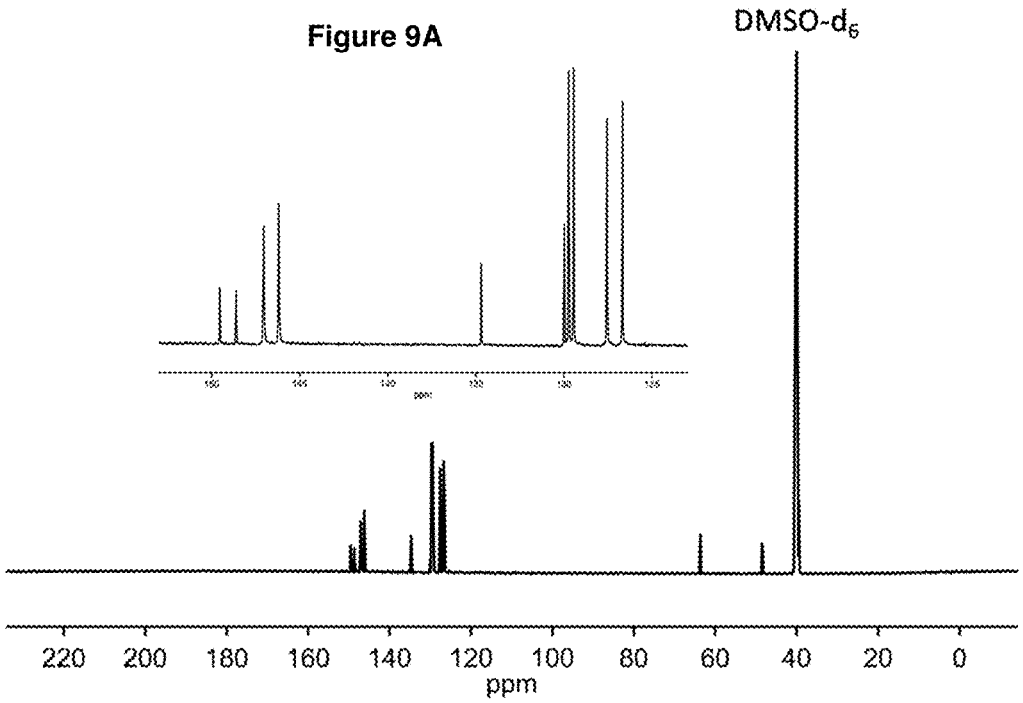
FIG. 9B is a $^{13}C$ NMR Spectra of [Bn-bpy-$Me^{2+}$][$Br^-$][$I^-$]

Synthesis of [Bn-bpy-Me²⁺][Br⁻][I⁻]. In an oven-dried 100 ml round-bottom flask, a mixture of [bpy-Me⁺][I⁻] (415.7 mg, 1.395 mmol) and benzyl bromide (285 mg, 1.67 mmol, 1.2 equiv.) in MeCN (20.0 mL) was stirred at reflux for 24 h, during which time a red precipitate formed. After cooling to rt, the red precipitate was collected and washed with EtOAc (2×100 mL). The red powder was collected to yield [Bn-bpy-Me²⁺][Br⁻][I⁻] (561 mg, 86% yield). Referring to FIG. 9, ¹H NMR (401 MHz, DMSO-$d_6$) δ 9.60 (d, J=6.7 Hz, 2H), 9.33 (d, J=6.6 Hz, 2H), 8.90-8.72 (m, 4H), 7.72-7.60 (m, 2H), 7.52-7.40 (m, 3H), 6.01 (s, 2H), 4.46 (s, 3H). ¹³C NMR (126 MHz, DMSO) δ 149.54, 148.60, 147.04, 146.19, 134.70, 129.97, 129.73, 129.49, 127.55, 126.67, 63.65, 48.49.

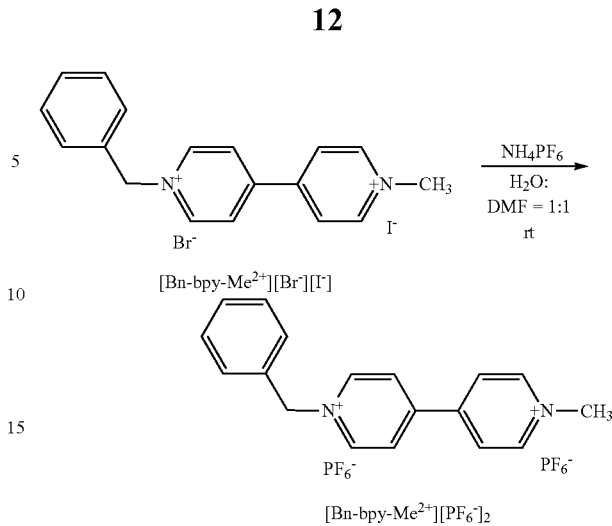

Figures 10A, 10B:
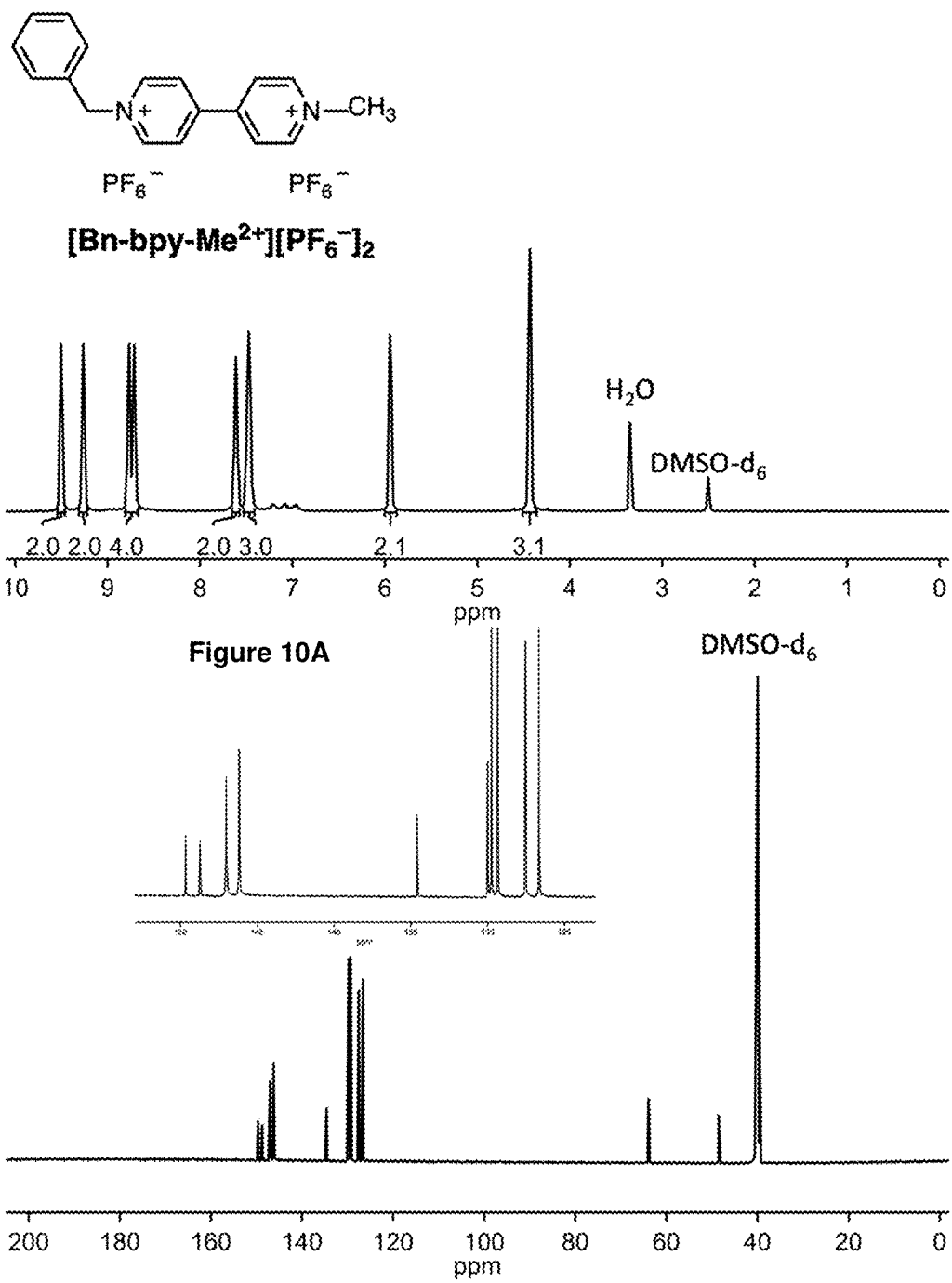
FIG. 10A is an $^1H$ NMR Spectra of [Bn-bpy-$Me^{2+}$][$PF_6^-$]$_2$.
FIG. 10B is a $^{13}C$ NMR Spectra of [Bn-bpy-$Me^{2+}$][$PF_6^-$]$_2$.
Figure 11A:
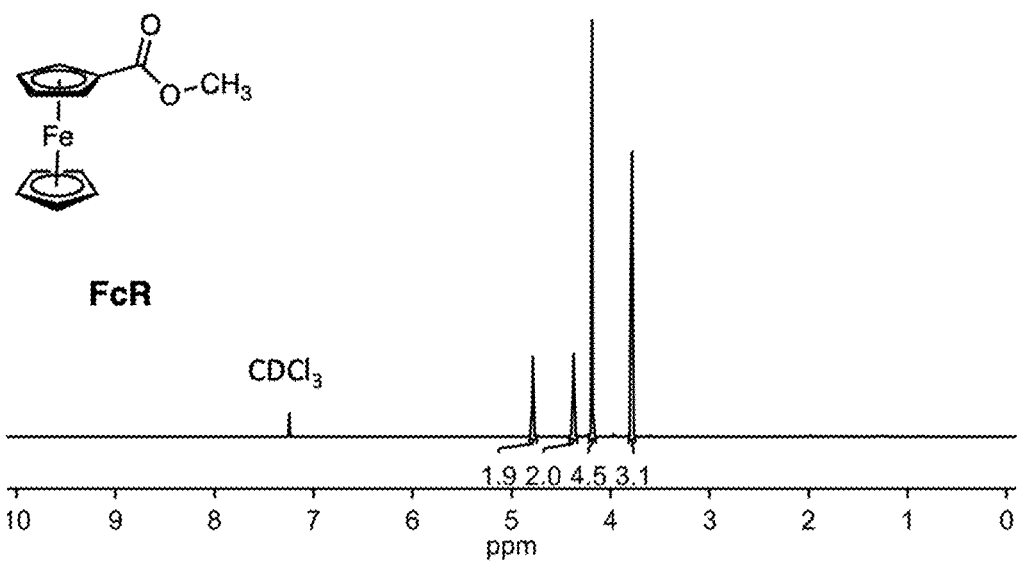
FIG. 11A is an $^1H$ NMR Spectra of FcR. $^1H$ NMR (401 MHz, $CDCl_3$) δ 4.78 (s, J=1.9 Hz, 2H), 4.37 (s, J=2.0 Hz, 2H), 4.19 (s, 5H), 3.79 (s, 3H).
Figure 11B:
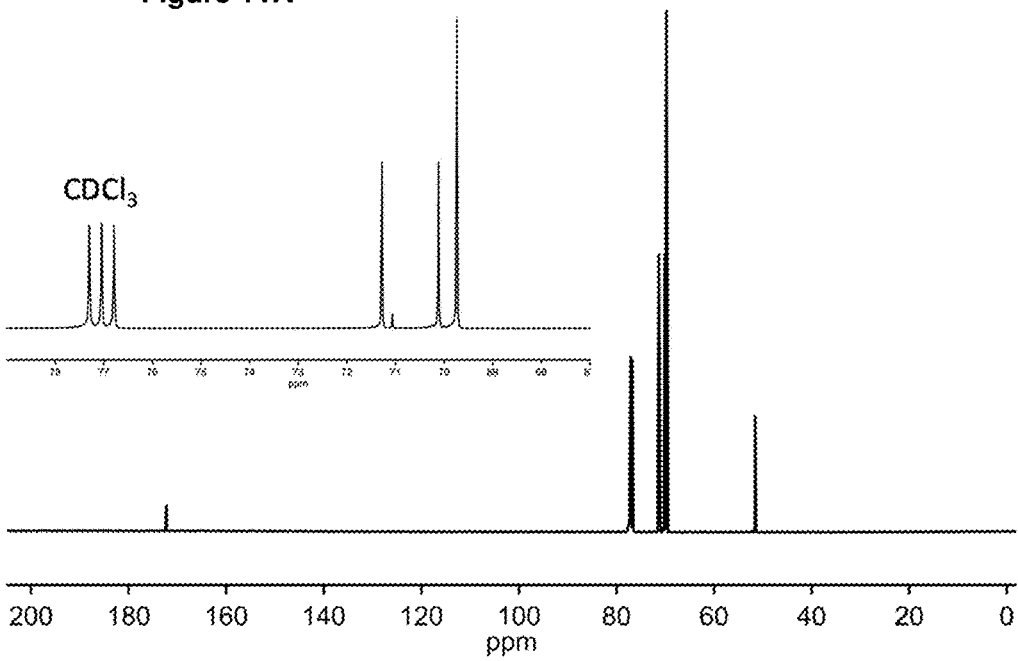
FIG. 11B is a $^{13}C$ NMR Spectra of FcR. $^{13}C$ NMR (126 MHz, $CDCl_3$) δ 172.22, 71.28, 71.06, 70.25, 69.85, 51.60.
Figures 14A, 14B:
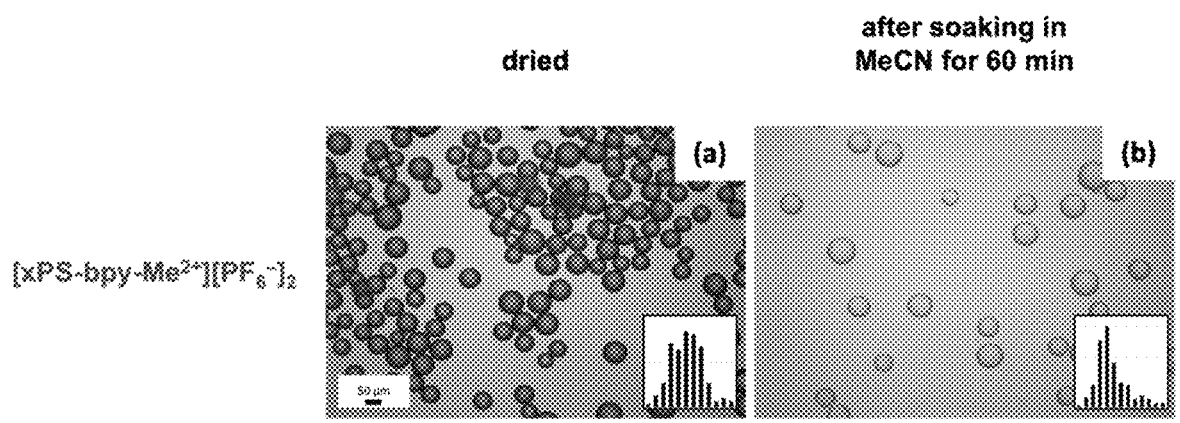
FIG. 14A is an optical microscope image of dried [xPS-bpy-$Me^{2+}$][$PF_6^-$]$_2$. Inset (bar charts) indicates the distribution of diameter of the beads.
FIG. 14B is an optical microscope image of the [xPS-bpy-$Me^{2+}$][$PF_6^-$]$_2$ after soaking in MeCN for 60 min. Inset (bar charts) indicates the distribution of diameter of the beads.
Figures 14C, 14D:
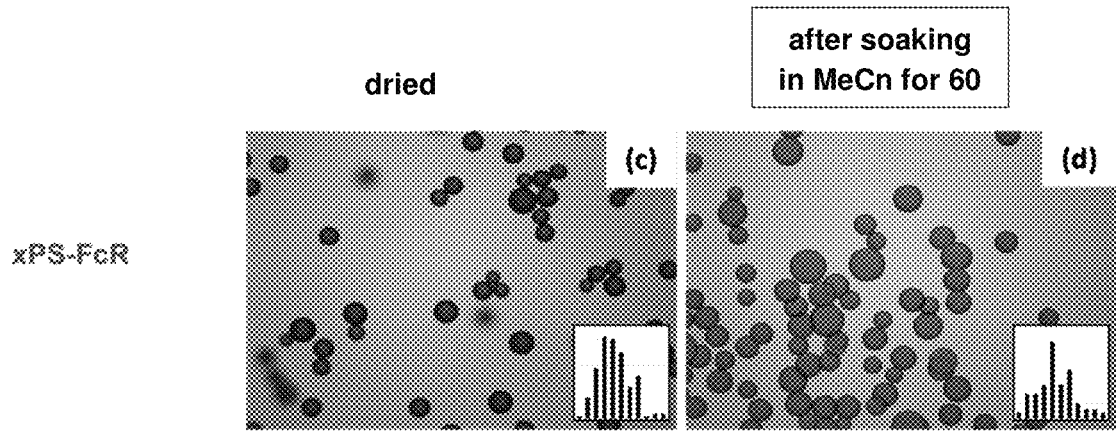
FIG. 14C is an optical microscope image of dried xPS-FcR. Inset (bar charts) indicates the distribution of diameter of the beads.
FIG. 14D is an optical microscope image of the xPS-FcR after soaking in MeCN for 60 min. Inset (bar charts) indicates the distribution of diameter of the beads.
Figure 15:
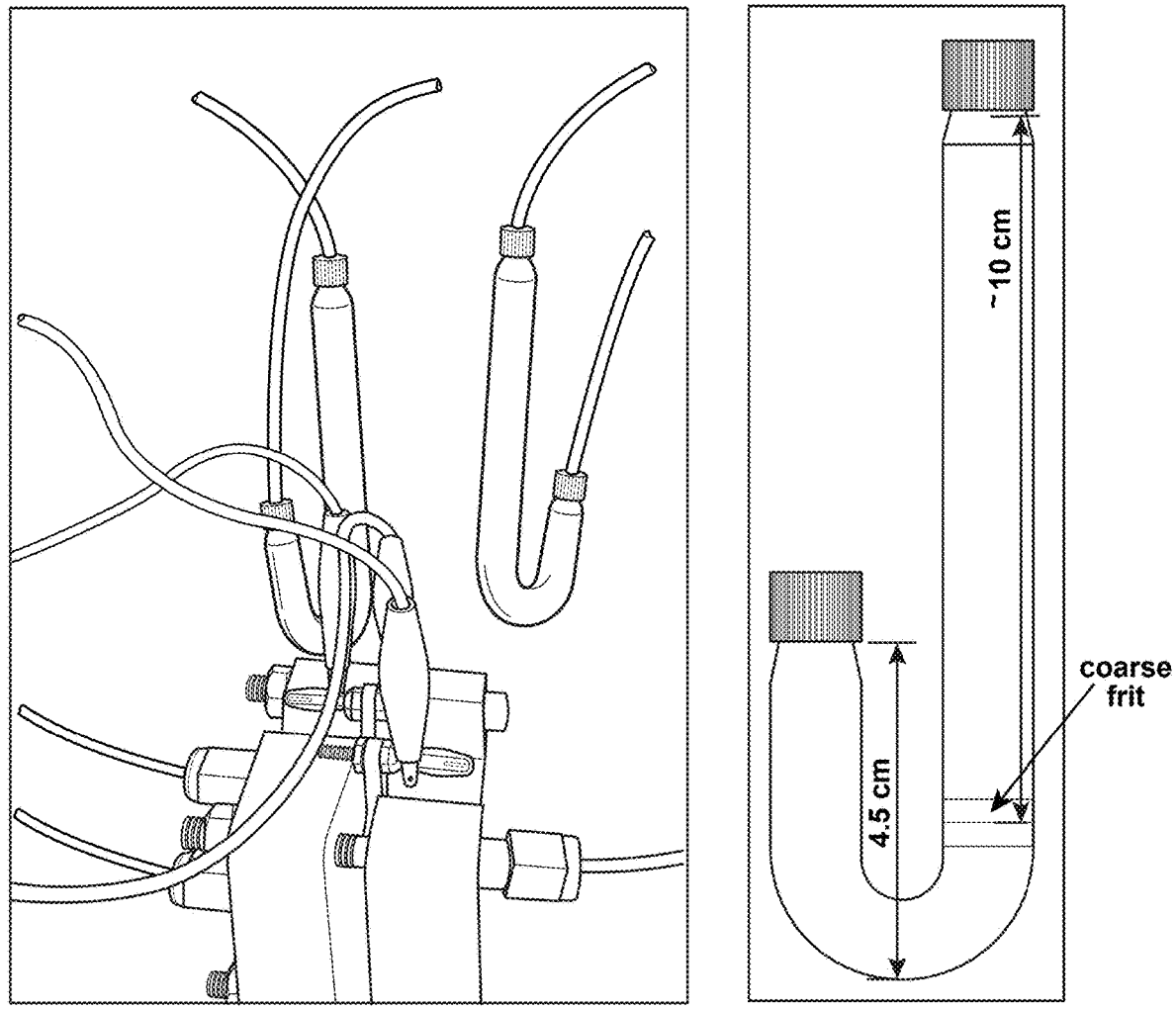
FIG. 15 is an image of an experimental setup of a redox-matched flow battery in accordance with the disclosure.

Synthesis of [Bn-bpy-Me²⁺][$PF_6^-$]$_2$. In a 20 ml vial, [Bn-bpy-Me²⁺][Br⁻][I⁻] (100 mg, 0.214 mmol) was dissolved in a 1:1 mixture of deionized water (2.5 mL) and DMF (2.5 mL). This homogenous solution was added dropwise via syringe into another 20 mL vial containing excess $NH_4PF_6$ (192 mg, 1.18 mmol, 5.5 equiv.) in water (10 mL). A yellow precipitate formed instantly. The yellow solid was collected by filtration and then washed with water (2×50 mL). The solid was dried under vacuum to obtain [Bn-bpy-Me²⁺][$PF_6^-$]$_2$ as a yellow solid (118 mg, 97% yield). Referring to FIG. 10, ¹H NMR (401 MHz, DMSO-$d_6$) δ 9.50 (d, J=5.1 Hz, 2H), 9.26 (d, J=6.6 Hz, 2H), 8.81-8.67 (m, 4H), 7.60 (d, J=6.5 Hz, 2H), 7.47 (m, J=7.8 Hz, 3H), 5.94 (s, J=3.9 Hz, 2H), 4.51-4.36 (s, 3H). ¹¹C NMR (126 MHz, DMSO) δ 149.67, 148.73, 147.02, 146.18, 134.58, 130.00, 129.76, 129.34, 127.54, 126.66, 63.95, 48.51.

Figure 24:
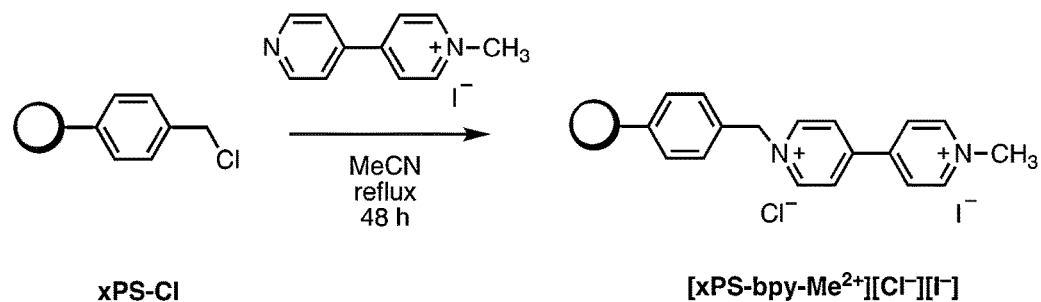
FIG. 24 is an illustration of a synthesis scheme for synthesizing [xPS-bpy-Me$^{2+}$][Cl$^-$][I$^-$]

Synthesis of [xPS-bpy-Me²⁺][Cl⁻][I⁻]. Referring to FIG. 24, in an oven-dried 100 ml round-bottom flask, a mixture of [bpy-Me⁺][I⁻] (197 mg, 0.66 mmol) and xPS-Cl (100 mg, 0.42 mmol Cl) in MeCN (30 mL) was heated to reflux for 48 h, during which time the beads turned red. After cooling to room temperature, the red beads were collected by filtration and then washed with MeCN (30 mL). The beads were transferred to a centrifuge tube using MeCN and soaked in MeCN (30 mL) for 30 min. The MeCN was decanted, then fresh MeCN was added (30 mL) and soaked for another 30 min. The MeCN was decanted. The red solid was dried and collected (75% conversion of the chloromethyl groups). (EA: C 65.48%, H 5.73%, N 2.51%, Cl 9.07%, I 13.77%) (theoretical EA for 75% conversion of the chloromethyl groups with 0.50 equiv of MeCN present: C 61.71%, H 5.36%, N 6.76%, Cl 7.10%, 119.07%).

Figure 25:
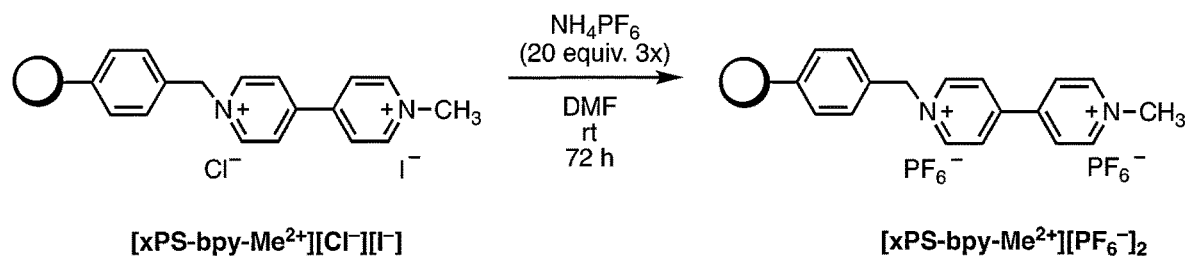
FIG. 25 is an illustration of a synthesis scheme for synthesizing [xPS-bpy-Me$^{2+}$][PF$_6^-$]$_2$.

Synthesis of [xPS-bpy-Me²⁺][$PF_6^-$]$_2$. Referring to FIG. 25, in a 20 ml vial, [xPS-bpy-Me²⁺][Cl⁻][I⁻] (100 mg, 0.256 mmol Cl⁻, I⁻ each) and $NH_4PF_6$ (835 mg, 5.12 mmol, 20 equiv.) were added into DMF (15 mL) in a centrifuge tube. The mixture was agitated using a shaker (Sonics SHK-COCK2) for 24 h. Then, the supernatant was decanted, and $NH_4PF_6$ (835 mg, 5.12 mmol, 20 equiv.) in DMF (10 mL) solution was added. The mixture was shaken for another 24 h. The supernatant was decanted, and the procedure was repeated (for a total of three times). The beads were soaked for 30 min in neat DMF (50 mL) and the DMF then decanted. The beads were soaked for 30 min in neat MeCN (50 mL) and the MeCN then decanted. The yellow solid was vacuum dried and collected (95% ion exchange based on EA) (EA: C 57.37%, H 5.14%, N 3.44%, Cl 1.69%, 10.93%, F 21.15%) (theoretical EA for 95% ion exchange and 75% conversion of chloromethyl groups in reaction above): C 51.78%, H 4.35%, N 3.80%, Cl 1.84%, I 0.86%, P 7.98%, F 29.38%).

Figure 26:
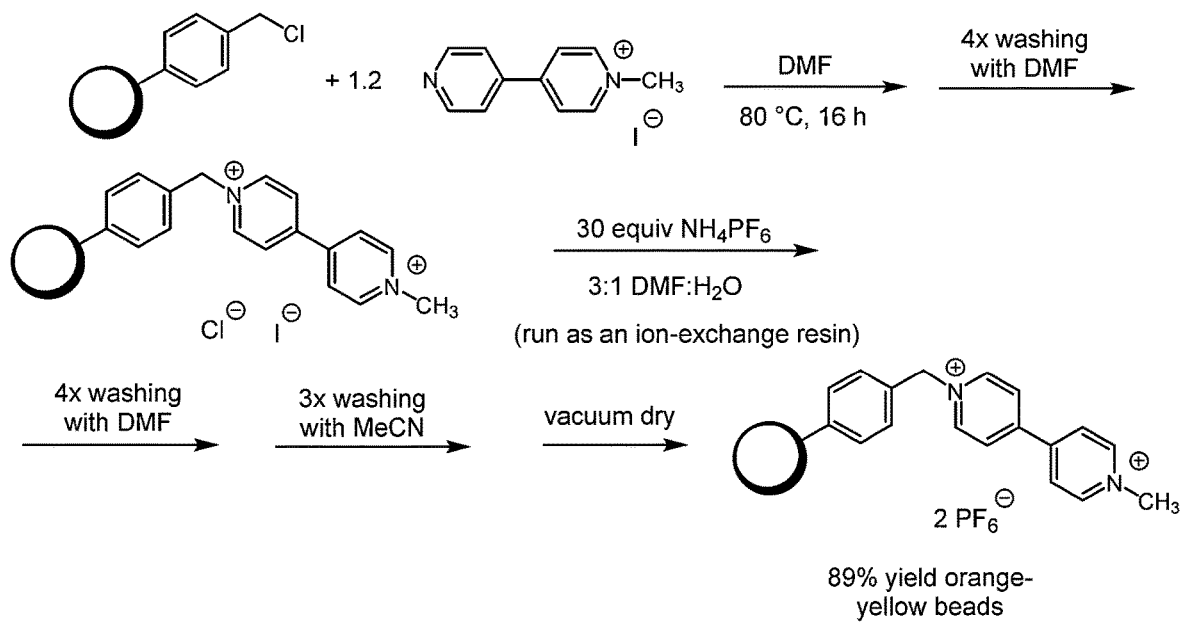
FIG. 26 is an illustration of an alternative synthesis scheme for synthesizing [xPS-bpy-Me$^{2+}$][PF$_6^-$]$_2$.

Alternative Synthesis Scheme of [XPS-bpy-Me$^{2+}$] [PF$_6^-$]$_2$. Referring to FIG. 26, in a 20 mL vial were combined Merrifield resin beads (800 mg, 3.36 mmol of Cl), bipy-Me$^+$ I$^-$ (1.202 g, 4.03 mmol, 1.2 equiv), 12 mL of DMF, and a stir bar. The vial was capped tightly and the mixture was placed in a 80° C. oil bath and gently stirred for 16 h. The mixture was allowed to cool and the orange supernatant solution was removed. A 10-12 mL portion of DMF was added, the mixture gently stirred for 60 s, and the DMF removed (repeated for 4 total times). A 12 mL portion of DMF was added and gently stirred for 4 h.

A solution of NH$_4$PF$_6$ (16.43 g, 100.8 mmol, 30 equiv) in 120 mL of 3:1 DMF:H$_2$O was prepared. The wet beads were transferred to a tall fritted glass filter and the NH$_4$PF$_6$ solution was added in portions and allowed to slowly gravity filter through the bed of beads, over a period of 2-3 h. The beads were then washed with 10 mL portions DMF, the first one quickly and then 3 times with 5 min contact time. A similar set of washes was performed with CH$_3$CN. The beads were allowed to air-dry for 16 h. Yield: 1.988 g (89%) of orange-yellow beads. IR spectroscopy confirmed the absence of a C—Cl absorption at 672 cm$^{-1}$ and the presence of a strong P—F absorption at 814 cm$^{-1}$.

Figure 27:
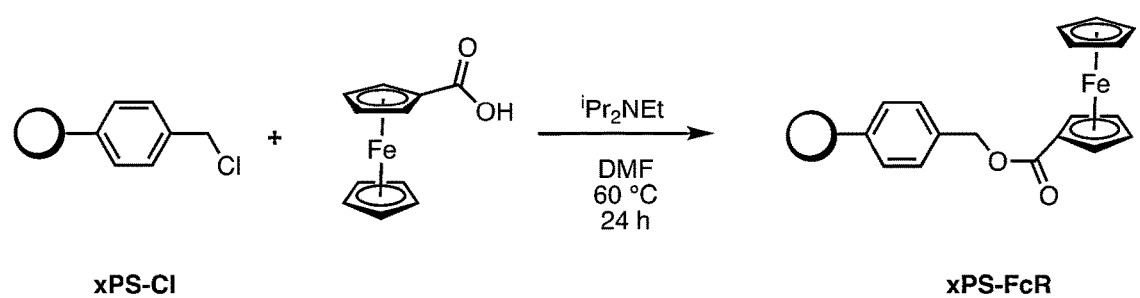
FIG. 27 is an illustration of a synthesis scheme for synthesizing XPs-FcR.

Synthesis of xPS-FcR. Referring to FIG. 27, in an oven-dried 100 ml round-bottom flask, a mixture of xPS-Cl (200 mg, 0.840 mmol Cl), ferrocene carboxylic acid (242 mg, 1.05 mmol), and diisopropylethylamine (0.183 mL, 1.05 mmol) was stirred in DMF (30 mL) for 24 h at 60° C. After cooling to rt, the dark brown beads were collected by filtration and washed with DMF (30 mL). Then the beads were transferred to a centrifuge tube using DMF and soaked in DMF (30 mL) for 30 min. The DMF was decanted, and fresh DMF (30 mL) was added and soaking repeated for another 30 min. The DMF was decanted, and MeCN (30 mL) was added soaking repeated for 30 min. The MeCN was decanted, and the MeCN wash was repeated for a total of 3 MeCN washes. The brown solid was vacuum dried and collected (70% conversion of the chloromethyl groups based on EA) (EA: C 72.26%, H 6.52%, N 1.05%, Cl 2.66%) (theoretical EA for 70% conversion of the chloromethyl groups with 0.16 equiv of DMF present: C 73.43%, H 6.10%, N 1.03%, Cl 2.69%, Fe 9.89%).

Synthesis of FcCOOLi. Ferrocenecarboxylic acid (Fc-COOH, 4.60 g, 20.0 mmol) and LiOH·H$_2$O (840 mg, 20.0 mmol) were dissolved in 100 mL methanol. The orange solution was filtered to remove a small amount of insoluble residue. To this solution was added 200 mL of 1-butanol and the orange-red solution was concentrated on a rotary evaporator at 60° C. until liquid ceased distilling (~200 mL remaining), during which an orange ppt formed. The suspension was allowed to cool, filtered, and the filter cake washed with 10 mL 1-butanol and then 3× 40 mL ether. The orange powder was allowed to air-dry. Yield: 3.603 g (76%). $^1$H NMR (401 MHz, d$_6$-DMSO) δ 4.65 (s, 2H), 4.42 (s, 2H), 4.25 (s, 5H).

Figure 28:
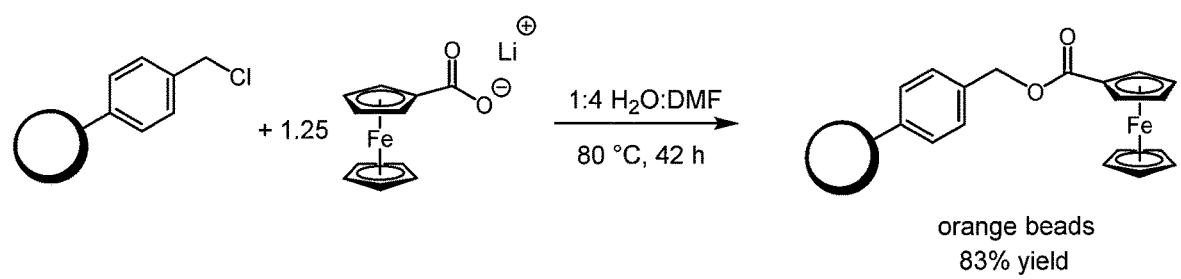
FIG. 28 is an illustration of a synthesis scheme for snythesizing xPS-OOCFc.

Synthesis of xPS-OOCFc. Referring to FIG. 28, in a 20 mL vial were combined Merrifield resin beads (952 mg, 4.0 mmol of Cl), FcCOOLi (1.180 g, 5.00 mmol), 15 mL of 1:4 H$_2$O:DMF, and a stir bar. The vial was capped tightly and the mixture was placed in a 80° C. oil bath and gently stirred for 42 h. The mixture was allowed to cool and the entire contents transferred to a centrifuge tube, using 22 mL of 1:4 H$_2$O:DMF to wash in product. The tube was put on a rocker for 30 minutes and then the orange-brown supernatant was removed. A 40 mL portion of DMF was added and the tube put on a rocker for 1.5 h, the supernatant removed, and this process repeated with 40 mL of DMF. The beads were then washed with 30 mL of CH$_3$CN, that solvent removed, and then 35 mL CH$_3$CN added and the centrifuge tube placed on a rocker overnight. The supernatant was decanted and the beads washed with CH$_3$CN and dried under vacuum. Yield: 1.353 g (83%) of orange beads. IR spectroscopy confirmed the absence of a C—Cl absorption at 672 cm$^{-1}$ Synthesis of Cyclopropenium Functionalization of Beads.

Figure 29:
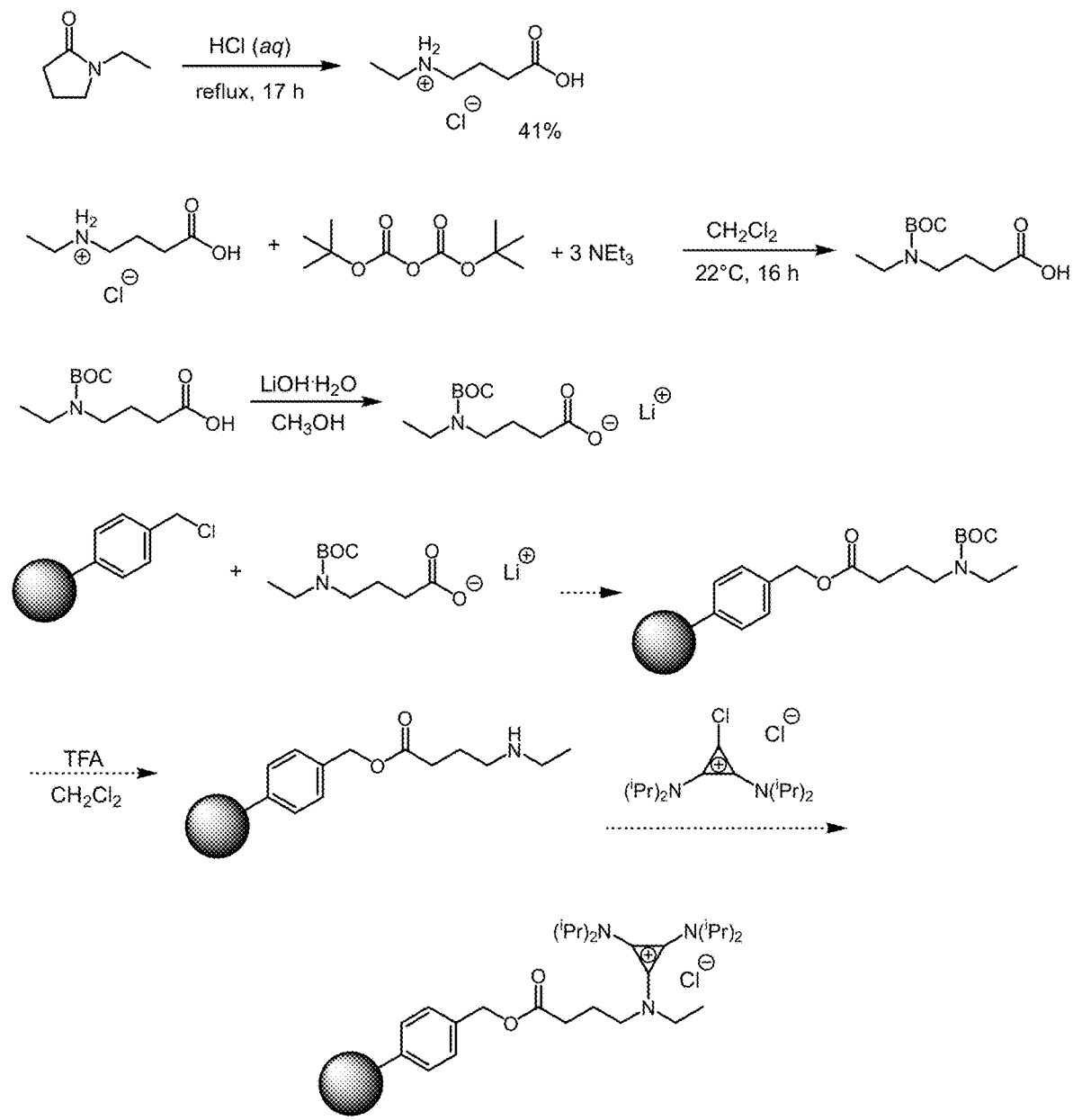
FIG. 29 is an illustration of a synthesis scheme for synthesizing cyclopropenium functionalized beads.

Tris(dialkylamino)cyclopropenium cations have an oxidation $E_{1/2}$ approximately 0.6 V higher than FcCOOR. Functionalization of beads with cyclopropenium was performed shown in FIG. 29.

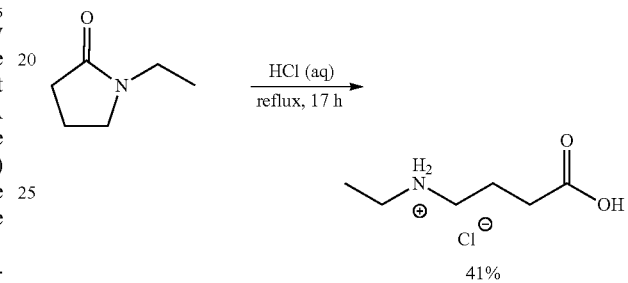

A solution of 1-ethyl-2-pyrrolidone (20.37 g, 180 mmol) and concentrated aqueous HCl (25 mL, 12 M, 300 mmol HCl) was placed in a 100 mL round-bottom flask and condenser under N$_2$. This was placed in a 140° C. oil bath to reflux under N$_2$ for 17 h. The water was then distilled from the solution at atmospheric pressure under N$_2$, leaving a viscous, pale yellow liquid. Addition of 35 mL of 2-propanol and heating yielded a homogeneous solution. To this solution was slowly added 400 mL of acetone, which yielded a white ppt. This solid product was isolated by filtration and washed with acetone, then air-dried. Yield: 12.317 g (41%) white microcrystalline solid. $^1$H NMR (401 MHz, D$_2$O) δ 3.07 (m, 4H), 2.50 (t, 2H), 1.95 (quin, 2H), 1.26 (t, 3H).

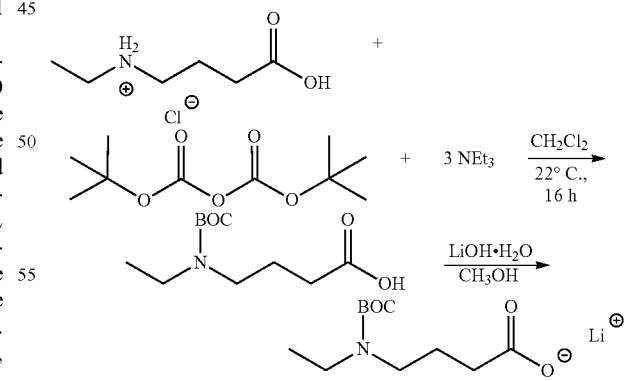

In a 50 mL round-bottom flask were combined the amine-HCl (335 mg, 2.00 mmol), 10 mL of CH$_2$Cl$_2$, triethylamine (607 mg, 6.00 mmol) and (BOC)$_2$O (446 mg, 2.04 mmol). The clear, colorless solution was stirred at 22° C. for 16 h. The solution was transferred to a separatory funnel and washed with 20 mL of a 0.50 M KHSO$_4$ (aq) solution (1.36 g in 20 mL H$_2$O, 10 mmol). The organic phase was collected, the aqueous phase washed with 3 mL of $CH_2Cl_2$, and the organic fractions combined and dried with $Na_2SO_4$. Rotary evaporation yielded a viscous, colorless oil. To this viscous oil was added $LiOH·H_2O$ (100 mg, 2.38 mmol) and 10 mL of methanol. The resulting mixture was swirled for several minutes, then the volatiles were removed by rotary evaporation, leaving a viscous oil and some white solid. This mixture was extracted with 3 mL of $CH_2Cl_2$ and filtered onto a PTFE dish. Volatiles were allowed to evaporate from the dish for 16 h, and the product was isolated by scraping it from the PTFE, yielding a white powder. Yield: 323 mg (68%). $^1H$ NMR (401 MHz, $CDCl_3$) δ 3.14 (m, 4H), 2.13 (br s, 2H), 1.71 (br quin, 2H), 1.43 (s, 9H). 1.05 (t, 3H).

Bead Swelling

Figure 16:
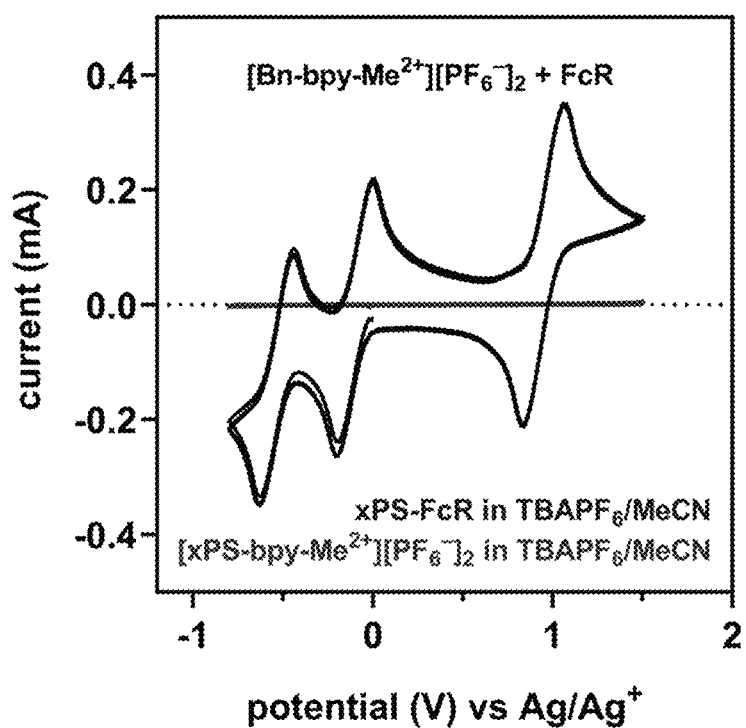
FIG. 16 is a graph showing cyclic voltammetry of 1:1 mixed solution of 5.0 mM FcR+5.0 mM [Bn-bpy-$Me^{2+}$][$PF_6^-$]$_2$ (black), xPS-FcR (dashed overlapped with solid line), and [xPS-bpy-$Me^{2+}$][$PF_6^-$]$_2$ (solid line) in 0.5 M $TBAPF_6$ in MeCN.
Figure 17A:
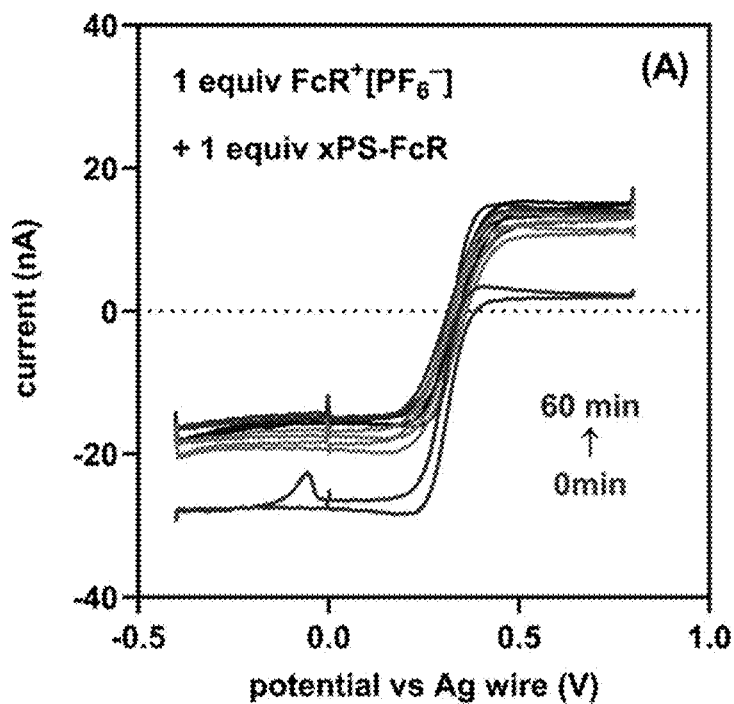
FIG. 17A is a graph showing ultramicroelectrode cyclic voltammograms of [$FcR^+$][$PF_6^-$] solution in contact with 1 equiv of xPS-FcR in the reservoir with recirculation by the pump (bypassing the cell stack)
Figure 17B:
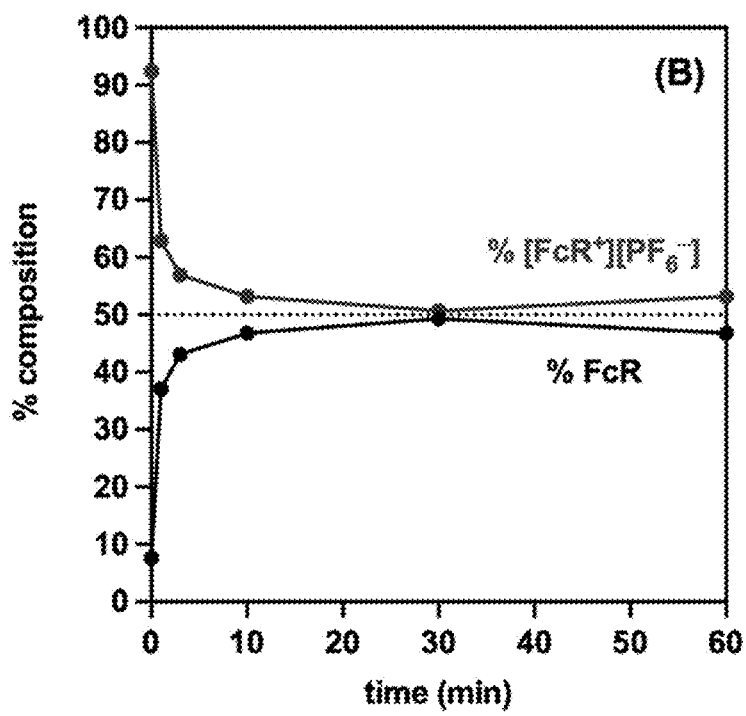
FIG. 17B is a graph showing percentage of [$FcR^+$][$PF_6^-$] and FcR present in solution over time.
Figure 17C:
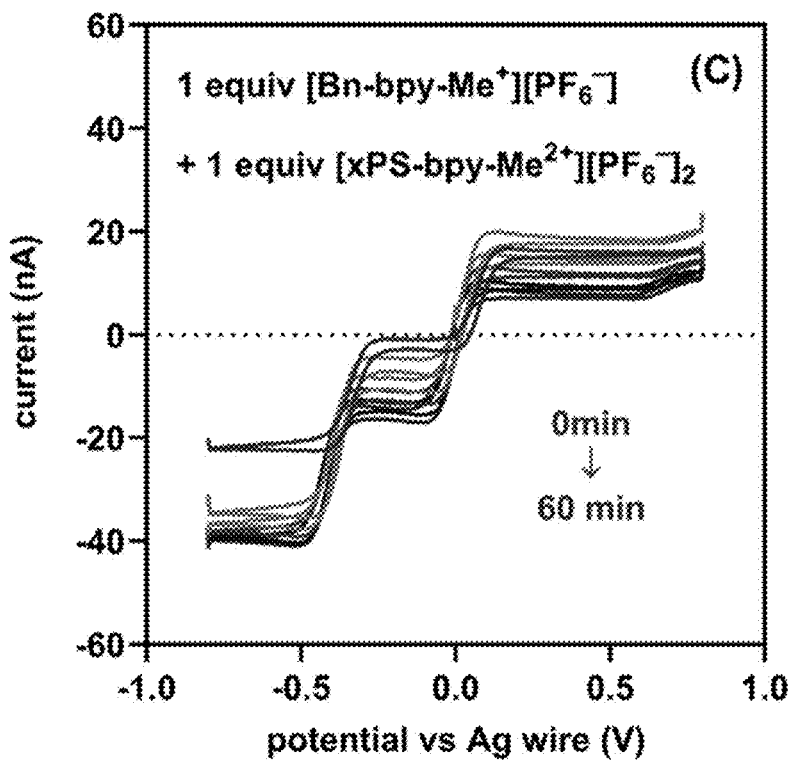
FIG. 17C is a graph showing ultramicroelectrode cyclic voltammograms of [Bn-bpy-$Me^+$][$PF_6^-$] solution in contact with 1 equiv of [xPS-bpy-$Me^{2+}$][$PF_6^-$]$_2$ in the reservoir with recirculation by the pump.
Figure 17D:
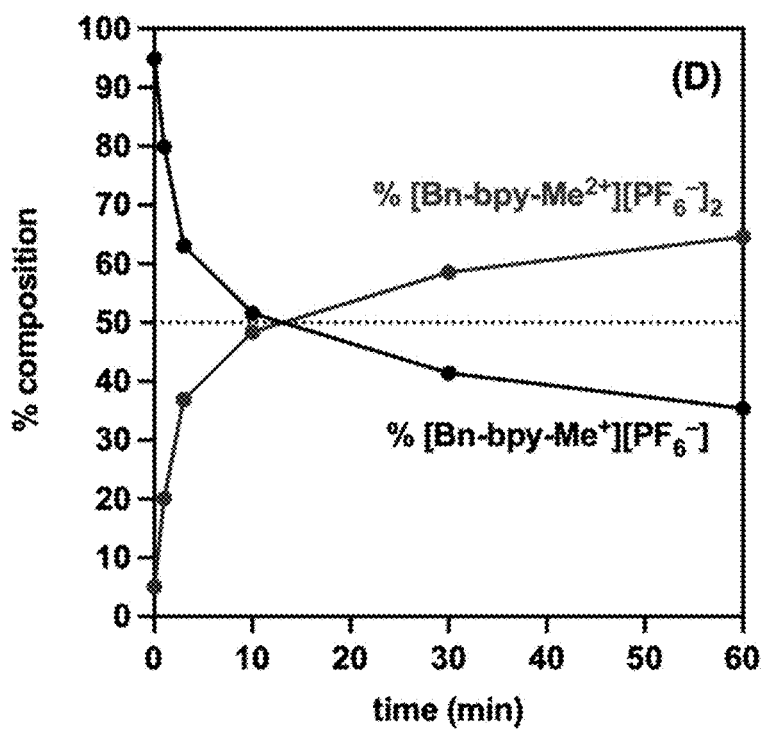
FIG. 17D is a graph showing percentage of [Bn-bpy-$Me^+$][$PF_6^-$] and [Bn-bpy-$Me^{2+}$][$PF_6^-$]$_2$ present in solution over time.
Figure 18A:
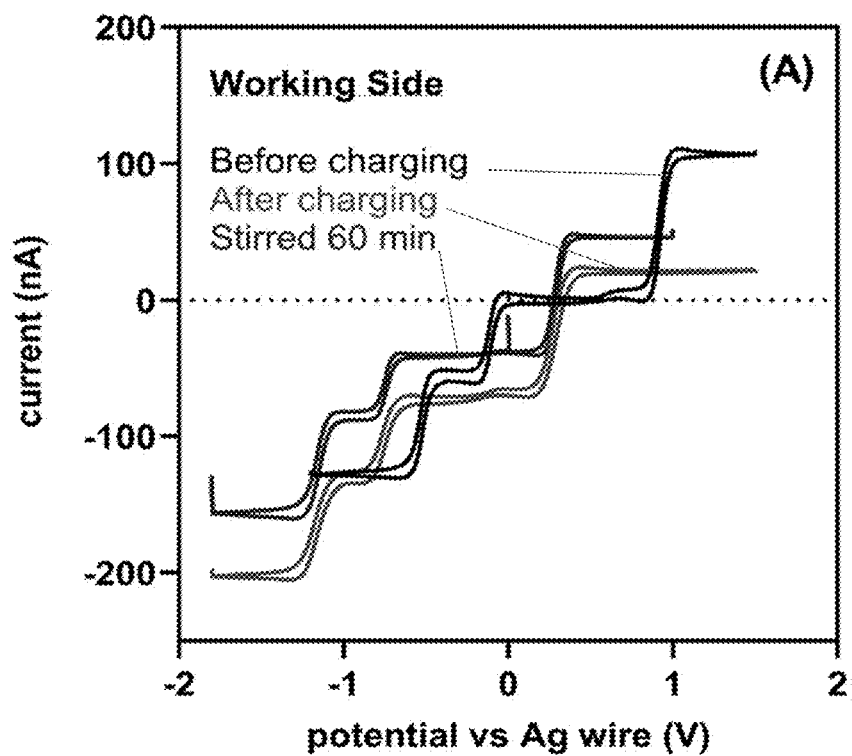
FIG. 18A is a graph showing ultramicroelectrode cyclic voltammetry of working side before charging, after charging, and stirred for 60 min after charging monitored by a microelectrode with 2 sheets of Celgard membrane as the separator.
Figure 18B:
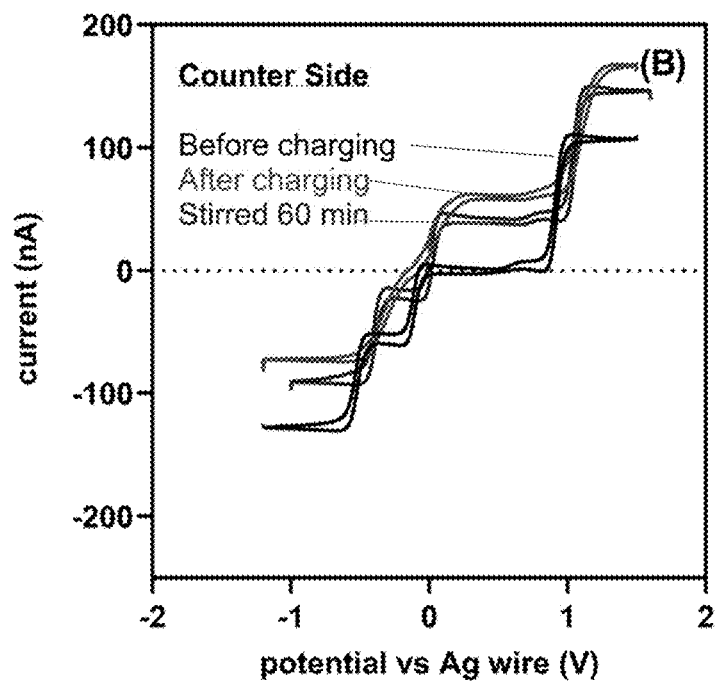
FIG. 18B is a graph showing cyclic voltammetry of counter side for the same experiment in FIG. 18A.
Figure 18C:
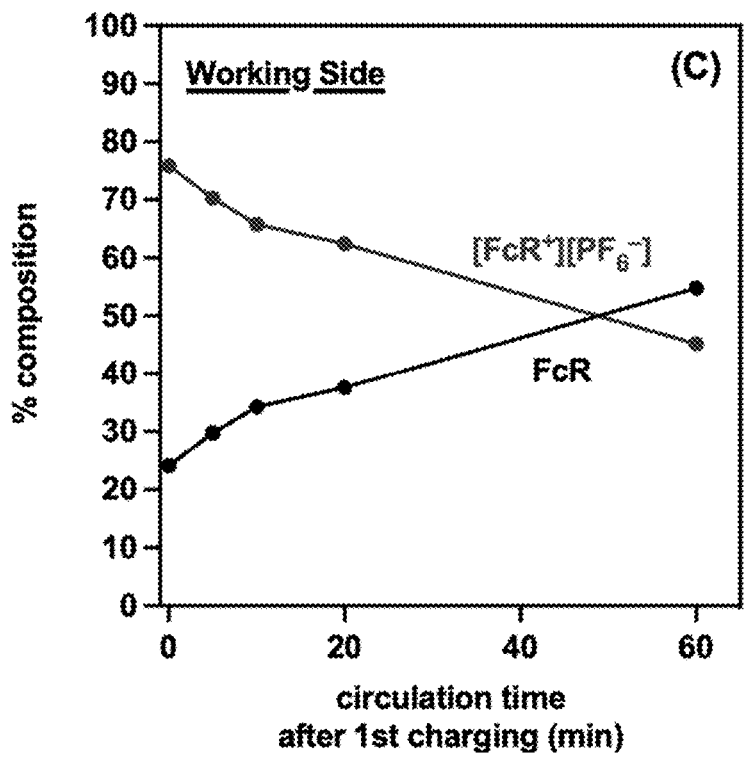
FIG. 18C is a graph showing calculated percentages of FcR and [$FcR^+$][$PF_6^-$] over circulation time after charging.
Figure 18D:
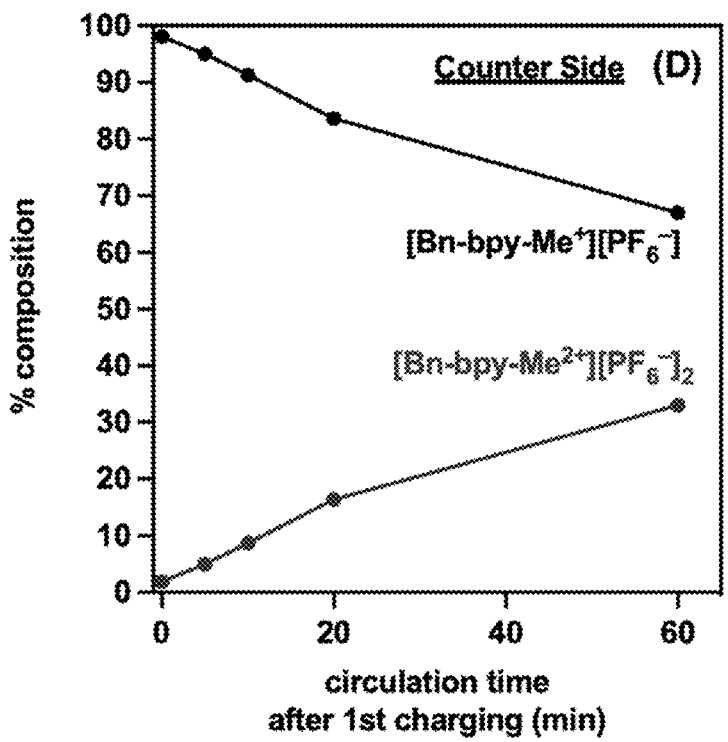
FIG. 18D is a graph showing Calculated percentages of [Bn-bpy-Me$^{2+}$][PF$_6^-$]$_2$ and [Bn-bpy-Me$^+$][PF$_6^-$] over circulation time after charging.
Figure 19A:
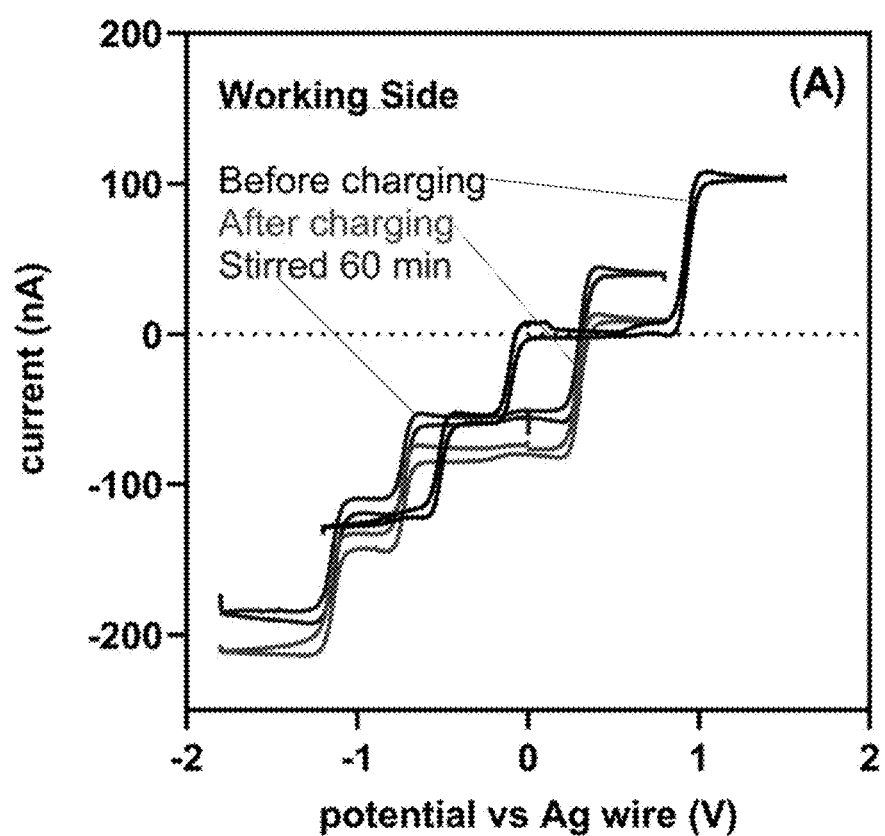
FIG. 19A is a graph showing ultramicroelectrode cyclic voltammetry of working side before charging, after charging, and stirred for 60 min after charging monitored by a microelectrode with 1 sheet of Daramic membrane as the separator.
Figure 19B:
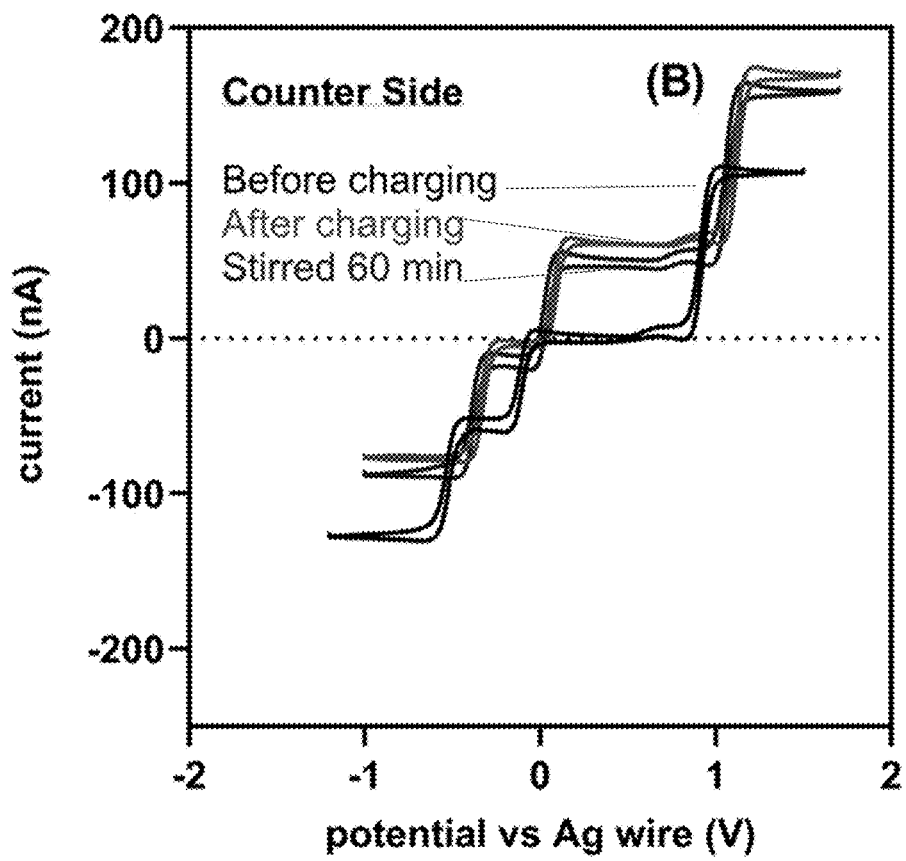
FIG. 19B is a graph showing cyclic voltammetry of counter side for the same experiment.
Figure 19C:
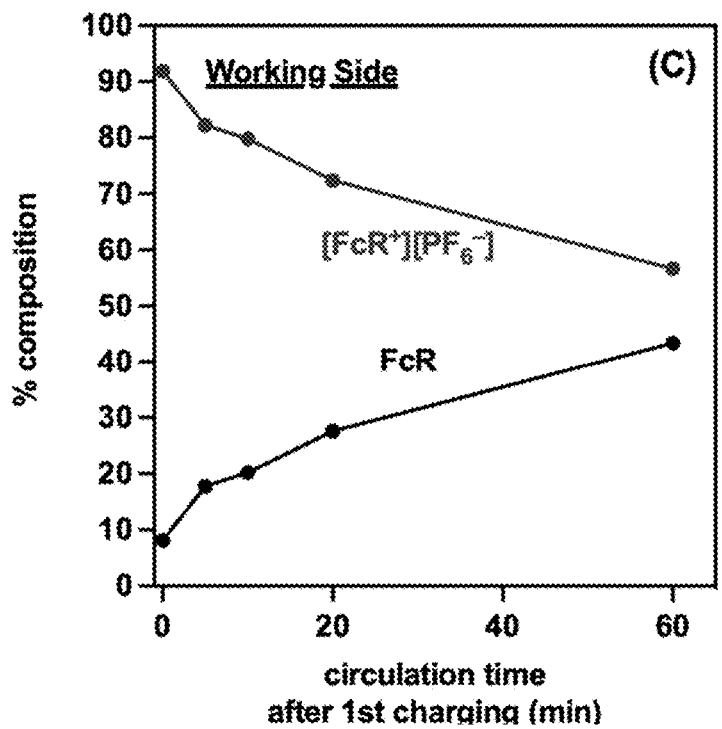
FIG. 19C is a graph showing calculated percentages of FcR and [FcR$^+$][PF$_6^-$] over circulation time after charging.
Figure 19D:
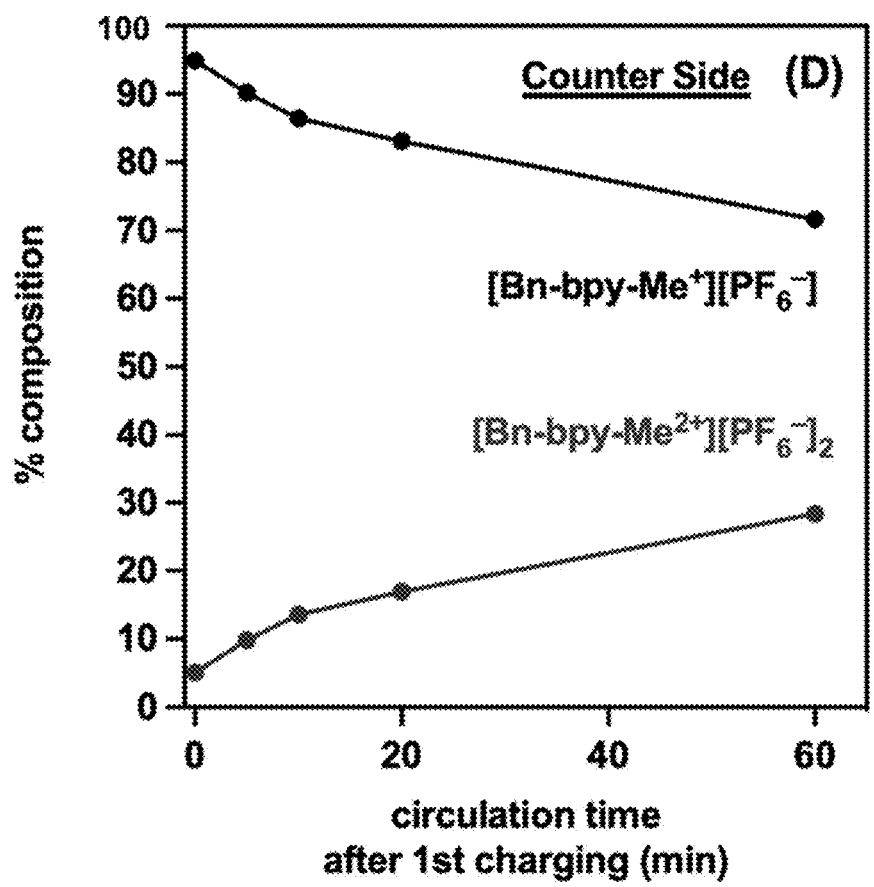
FIG. 19D is a graph showing Calculated percentages of [Bn-bpy-Me$^{2+}$][PF$_6^-$]$_2$ and [Bn-bpy-Me$^+$][PF$_6^-$] over circulation time after charging
Figure 20A:
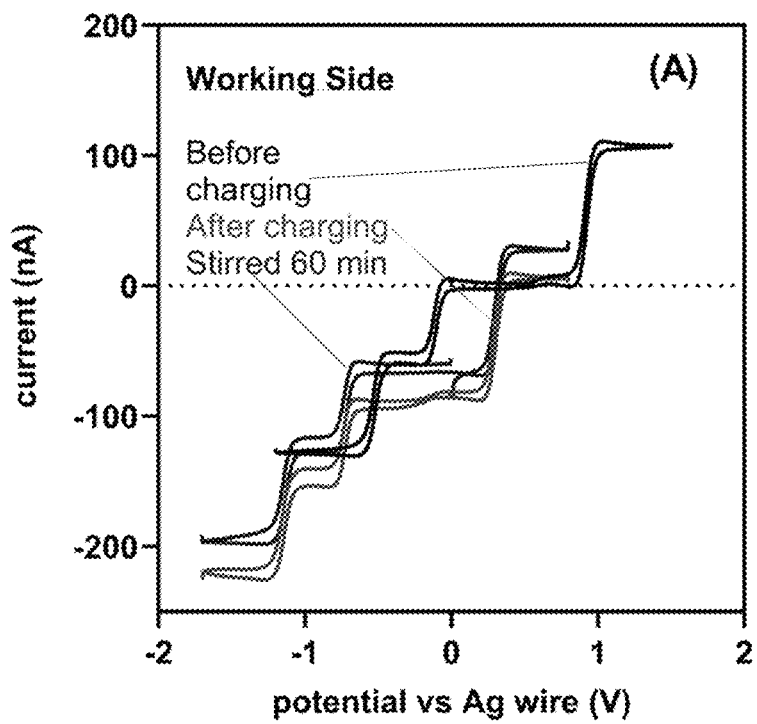
FIG. 20A is a graph showing Ultramicroelectrode cyclic voltammetry of working side before charging (black), after charging (gray), and stirred for 60 min after charging monitored by a microelectrode with 2 sheets of Daramic membrane as the separator.
Figure 20B:
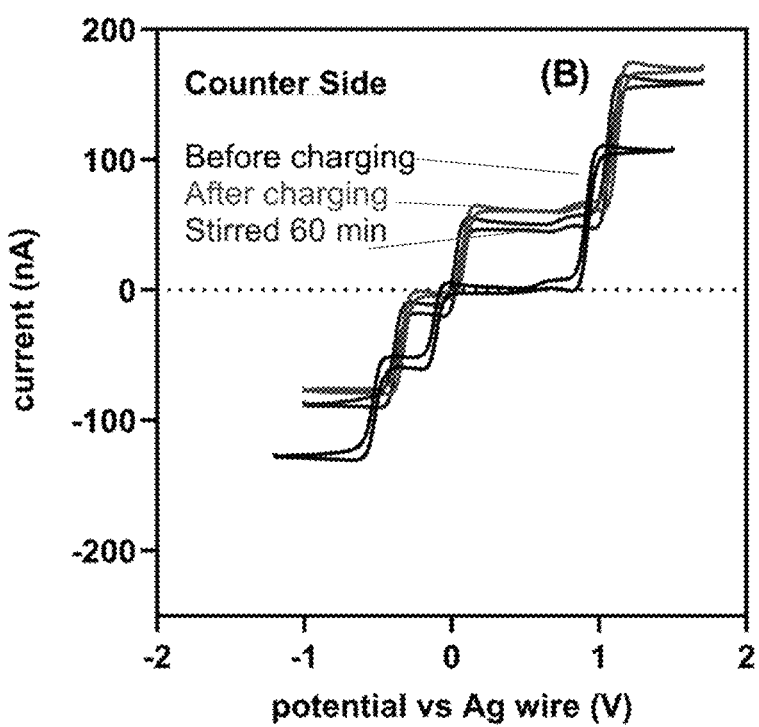
FIG. 20B is a graph showing cyclic voltammetry of counter side for the same experiment in FIG. 20A.
Figure 20C:
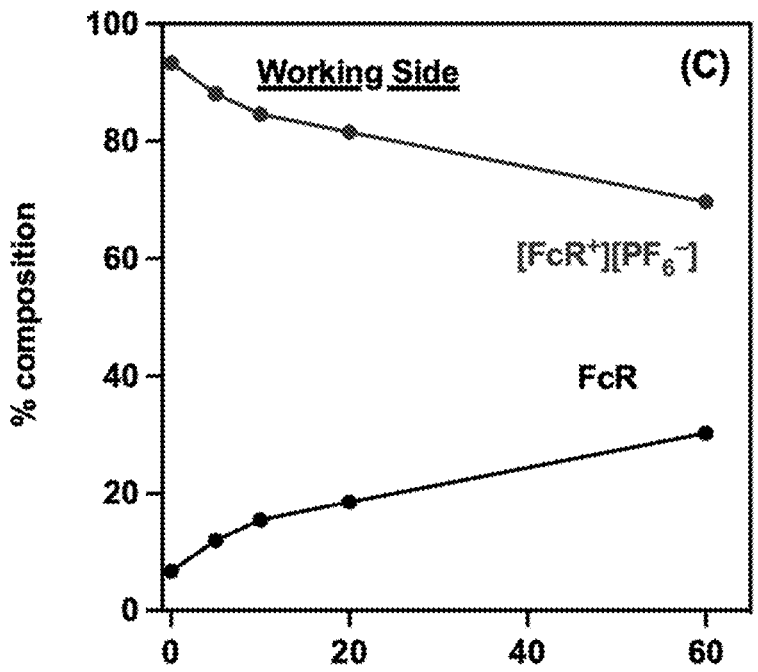
FIG. 20C is a graph showing calculated percentages of FcR and [FcR$^+$][PF$_6^-$] over circulation time after charging.
Figure 20D:
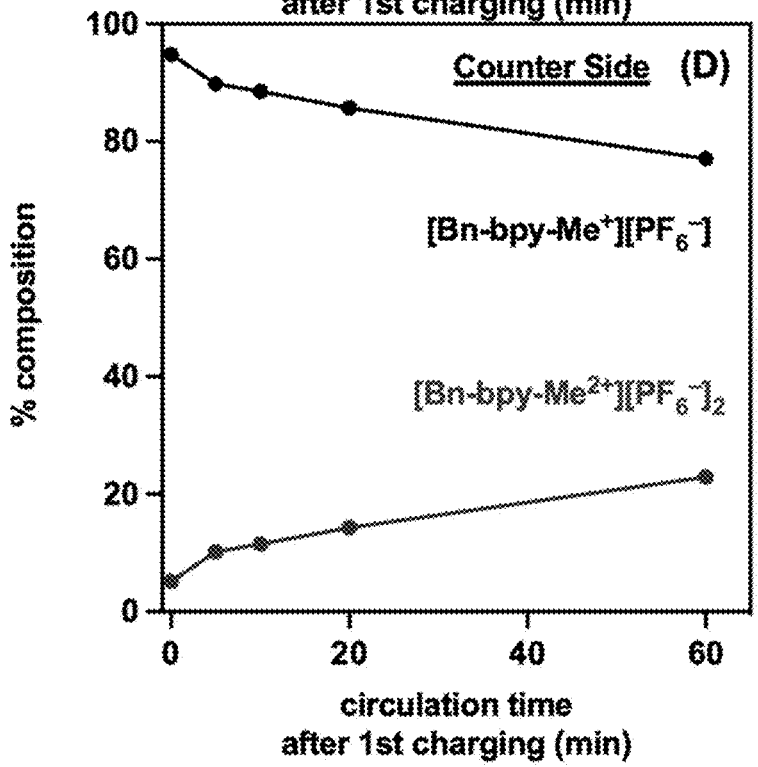
FIG. 20D is a graph showing calculated percentages of [Bn-bpy-Me$^{2+}$][PF$_6^-$]$_2$ and [Bn-bpy-Me$^+$][PF$_6^-$] over circulation time after charging.
Figure 21A:
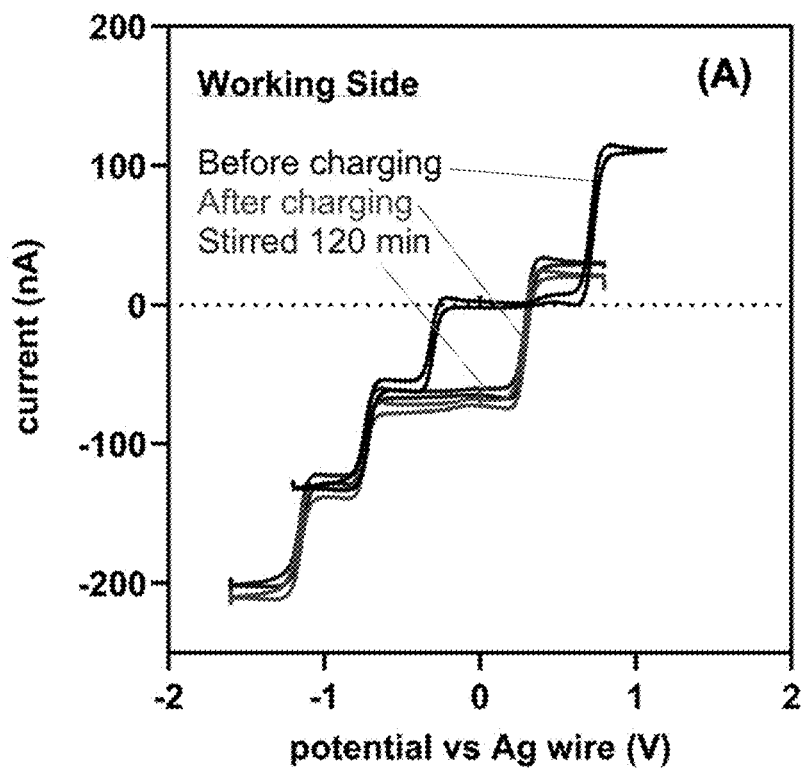
FIG. 21A is a graph showing ultramicroelectrode cyclic voltammetry of working side before charging (black), after charging (gray), and stirred for 60 min after charging monitored by a microelectrode with 1 sheet of Fumasep membrane.
Figure 21B:
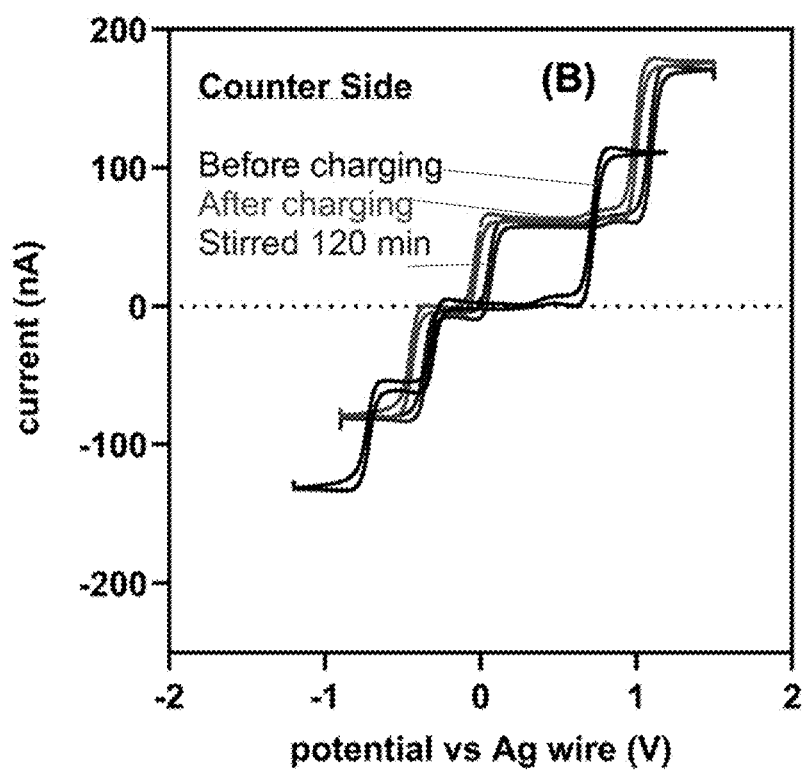
FIG. 21B is a graph showing cyclic voltammetry of counter side for the same experiment as FIG. 21A.
Figures 21C, 21D:
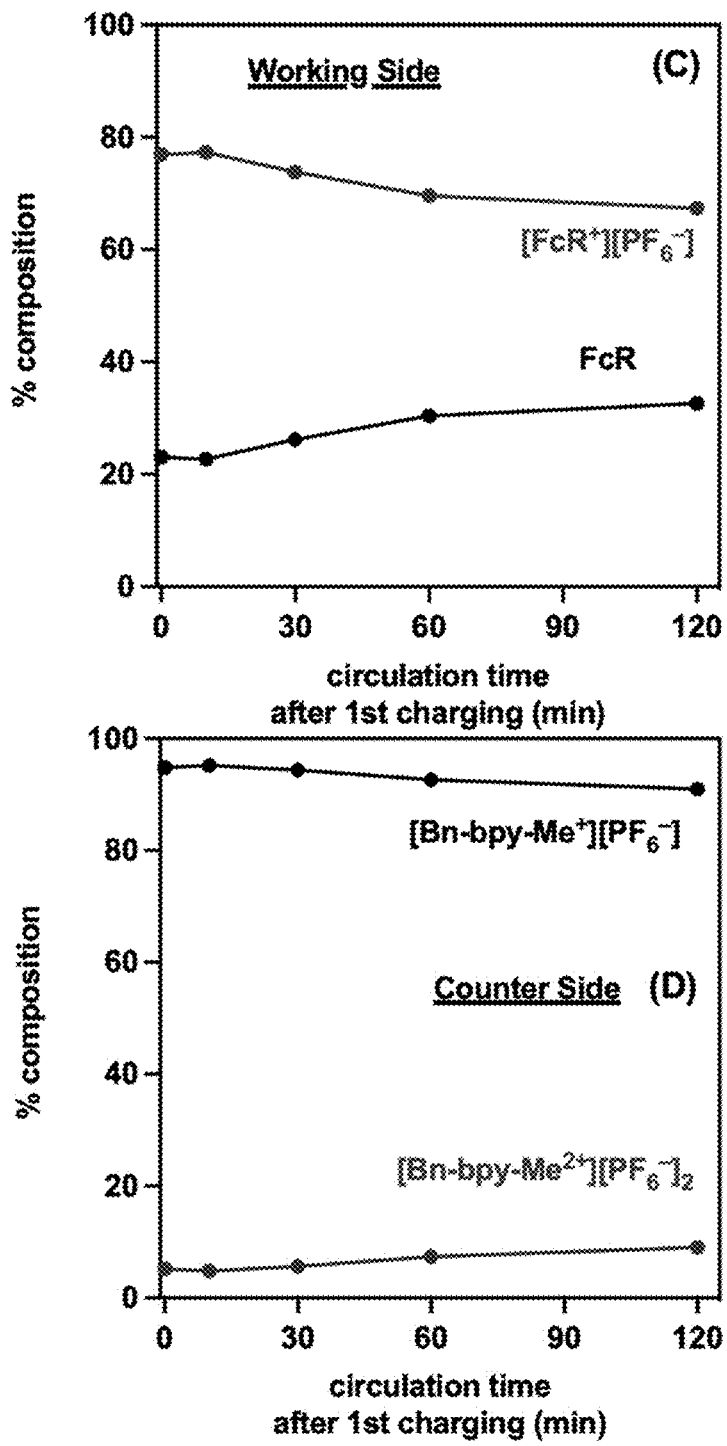
FIG. 21C is a graph showing calculated percentages of FcR and [FcR$^+$][PF$_6^-$] over circulation time after charging.
FIG. 21D is a graph showing calculated percentages of [Bn-bpy-Me$^{2+}$][PF$_6^-$]$_2$ and [Bn-bpy-Me$^+$][PF$_6^-$] over circulation time after charging.

To evaluate bead swelling a known mass (~100 mg) of beads was placed in a standard 5 mm NMR tube, added an excess of a solvent, and measured the change in height of the column of beads after 2 h. Calibration of the NMR tubes indicated a volume of 130 μL per cm of height. The measured volume change was multiplied by a factor of 0.74 (the packing fraction of close-packed spheres) to account for the interstitial spaces between the beads. The swelling of both bead types, xPS-Fc and $[xPS\text{-}bpy\text{-}Me^{2+}][PF_6^-]_2$, was measured in $CH_3CN$ and DMF. In $CH_3CN$ the swelling was 0.77 mL/g for the xPS-Fc and 0.96 mL/g for the $[xPS\text{-}bpy\text{-}Me^{2+}][PF_6^-]_2$, whereas in DMF the swelling was 1.83 mL/g for xPS-Fc and 1.15 mL/g for $[xPS\text{-}bpy\text{-}Me^{2+}][PF_6^-]_2$. The bead swelling was also evaluated by optical microscope images of a statistical sample of dry and swollen beads, which yielded similar results (FIG. 16). Table 1 is the calculated swelling. While the swelling was higher in DMF, cyclic voltammetry of FcR in DMF was not fully reversible, indicating reaction/decomposition of $FcR^+$ in DMF. For that reason $CH_3CN$ was chosen as the solvent for in the examples herein.

TABLE 1

| method | calculated volume of each bead from radius measured by optical microscope | | | measured volume per 100 mg of each bead using NMR tube | | |
|---|---|---|---|---|---|---|
| | dry | in MeCN | in DMF | dry | in MeCN | in DMF |
| xPS-Cl | 52 pL | 57 pL | 194 pL | 143 μL | 169 μL | 312 μL |
| xPS-FcR | 81 pL | 121 pL | 269 pL | 143 μL | 247 μL | 390 μL |
| $[xPS\text{-}bpy\text{-}Me^{2+}][PF_6^-]_2$ | 82 pL | 144 pL | 211 pL | 143 μL | 273 μL | 299 μL |

Electrochemical Materials and Methods

Acetonitrile (MeCN) (99.8%, anhydrous) was obtained from Sigma Aldrich and used as received. Tetrabutylammonium hexafluorophosphate ($TBAPF_6$, electrochemical grade) and silver hexafluorophosphate ($AgPF_6$) were obtained from Sigma Aldrich and dried under high vacuum for 48 h before being transferred to a $N_2$-filled glovebox. A 0.50 M stock solution of the $TBAPF_6$ in MeCN was prepared in a $N_2$-filled glovebox (Mbraun Labmaster) with water <4 ppm and oxygen <0.5 ppm and dried over 3 Å molecular sieves for at least 2 days prior to use.

Celgard 2500 membranes were obtained from Asahi Kasei, Daramic 175 membranes were obtained from Daramic, LLC, and Fumasep (FAP-375-PP) ion-exchange membranes were obtained from Fuel Cell Store.

CYCLIC VOLTAMMETRY—Cyclic voltammetry was performed in a $N_2$-filled glovebox with a Biologic VSP multichannel potentiostat/galvanostat and a three-electrode electrochemical cell, consisting of a glassy carbon disk working electrode (3.0 mm diameter, area 0.071 $cm^2$, BASi), an $Ag/Ag^+$ reference electrode (BASi) with 0.010 M $AgPF_6$ in MeCN, and a platinum wire counter electrode (BASi). All experiments were conducted in a 0.50 M $TBAPF_6$/MeCN solution.

ULTRAMICROELECTRODE (UME) EXPERIMENTS (FIGS. 17 to 21)—UME experiments were performed in a $N_2$-filled glovebox with a Biologic VSP multichannel potentiostat/galvanostat and a three-electrode electrochemical cell, consisting of an UME platinum disk working electrode (10 μm diameter, BASi), a silver wire quasi-reference electrode (BASi), and a platinum wire counter electrode (BASi). All experiments were conducted in a 0.50 M $TBAPF_6$/MeCN solution. Plateau currents in the CVs were used to calculate the concentrations of neutral and charged mediators.

Figure 22A:
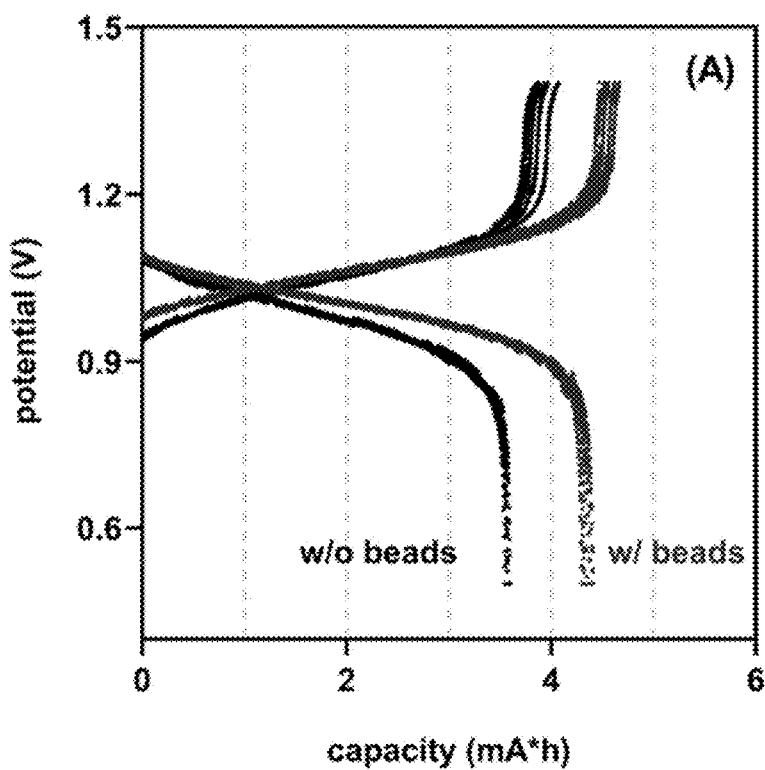
FIG. 22A is a graph showing potential versus capacity for a redox-match flow battery with or without 1 equiv. functionalized beads using 2 sheets of Celgard membrane as the separator.
Figure 22B:
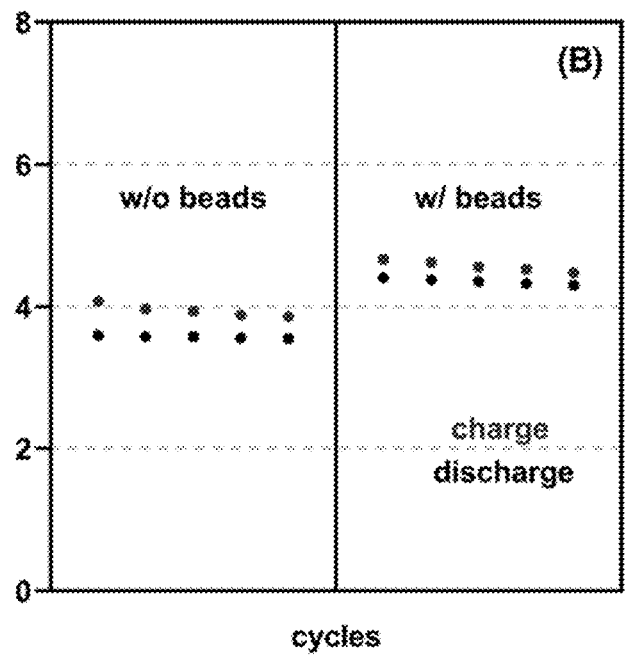
FIG. 22B is a graph showing capacity versus cycles a redox-match flow battery with or without 1 equiv. functionalized beads using 2 sheets of Celgard membrane as the separator.
Figure 22C:
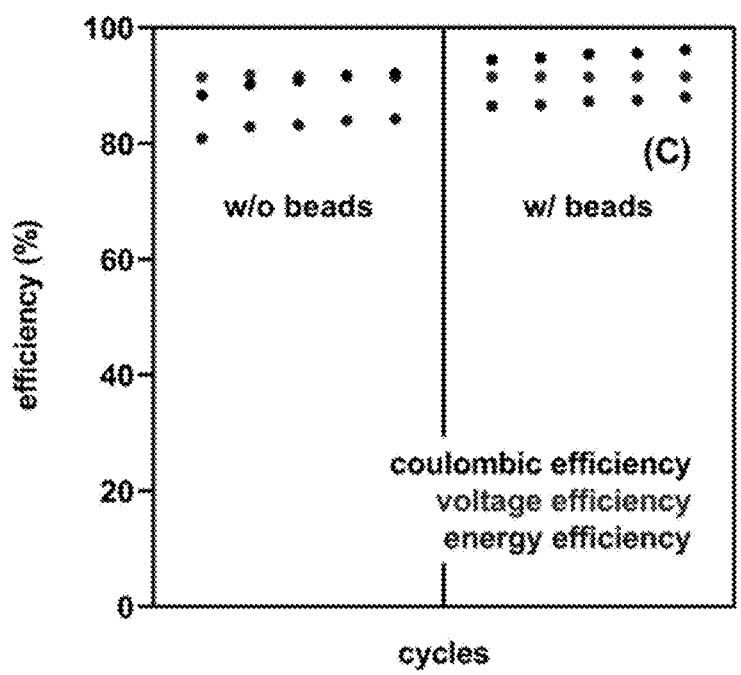
FIG. 22C is a graph showing efficiency versus cycles for a redox-match flow battery with or without 1 equiv. functionalized beads using 2 sheets of Celgard membrane as the separator.
Figure 23A:
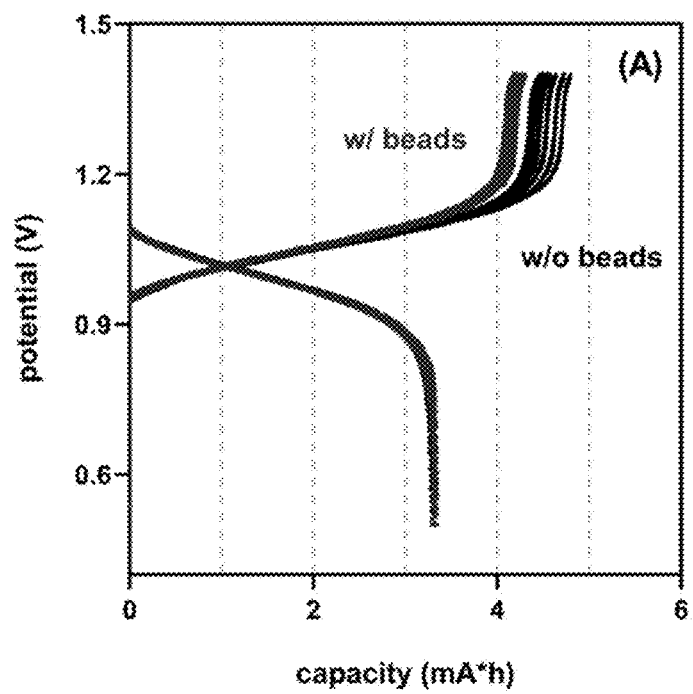
FIG. 23A is a graph showing potential versus capacity for a redox flow battery with or without 1 equiv. xPS-Cl (unfunctionalized beads) with 2 sheets of Celgard membrane as the separator. Data indicated that unfunctionalized beads had no impact on the redox flow battery.
Figure 23B:
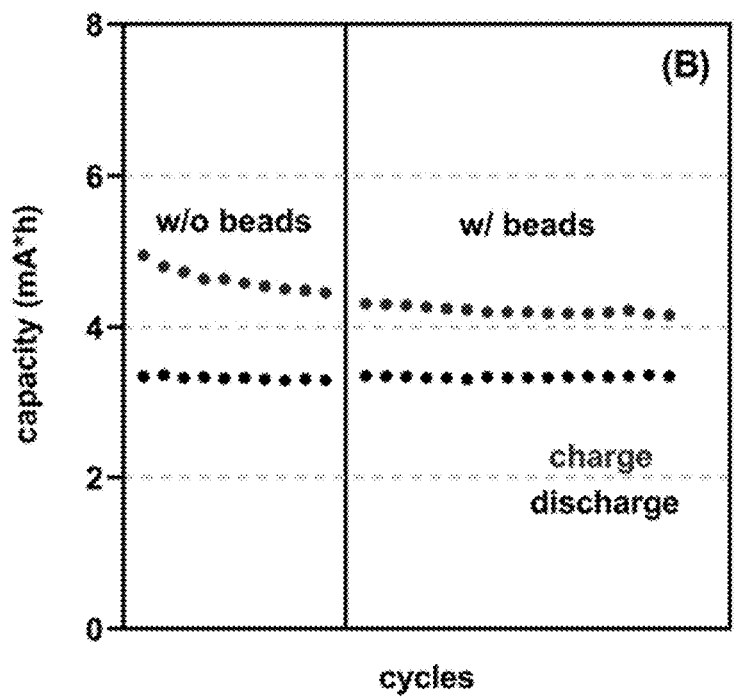
FIG. 23B is a graph showing capacity versus cycles a redox flow battery with or without 1 equiv. xPS-Cl (unfunctionalized beads) with 2 sheets of Celgard membrane as the separator. Data indicated that unfunctionalized beads had no impact on the redox flow battery.
Figure 23C:
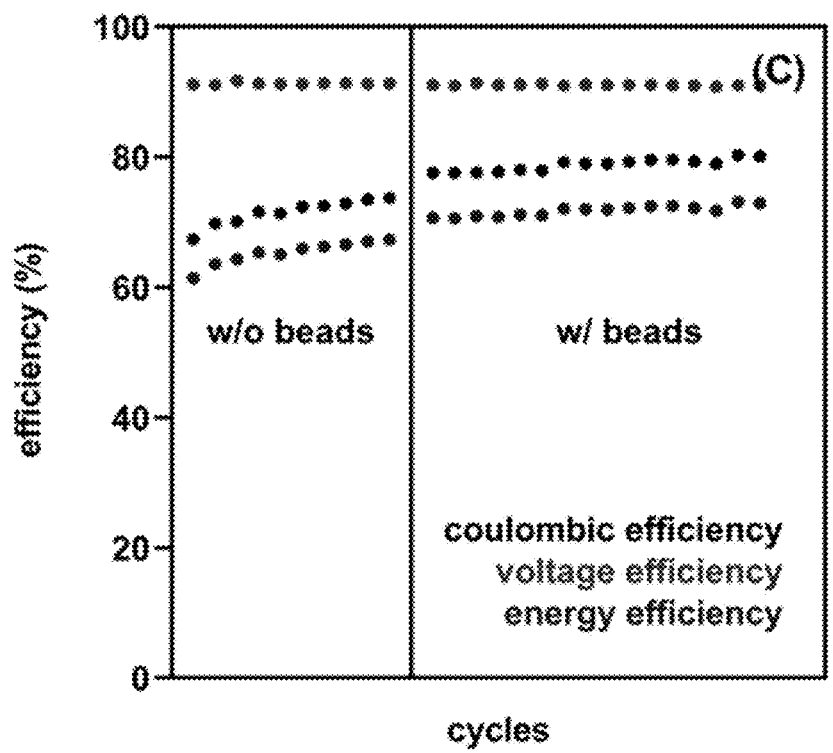
FIG. 23C is a graph showing efficiency versus cycles for a redox flow battery with or without 1 equiv. xPS-Cl (unfunctionalized beads) with 2 sheets of Celgard membrane as the separator. Data indicated that unfunctionalized beads had no impact on the redox flow battery.

FLOW CELL CYCLING (FIGS. 22 and 23)—Cycling under flow conditions was performed with a zero-gap flow cell comprised of graphite charge collecting plates containing an interdigitated flow field in combination with two layers of non-woven carbon felt electrodes (Sicracet 29AA) on each side. ePTFE gaskets were used to achieve ~20% compression of the felt.

A membrane separated the two half cells, and the exposed area of the membrane in the gasket window was used as the active area (2.55 $cm^2$). After assembly, both the catholyte side and anolyte side of the cell were loaded with a 15 mM (in each mediator) solution (12 mL) of 1:1 mixed FcR:[Bn-bpy-$Me^{2+}$][$PF_6^-$]$_2$ in 0.50 M $TBAPF_6$/MeCN. The cell was pretreated by continuously flowing the solution above at 10 mL/min for 30 min without any charging process using a peristaltic pump (Cole-Parmer) with Solveflex and PFA tubing. After this step, using the same flow rate, galvanostatic charge/discharge cycling was performed using a Bio-Logic VSP galvanostat employing a charging current of 25.5 mA (10 mA/$cm^2$) and a discharging current of −25.5 mA (−10 mA/$cm^2$) with +1.4 V and +0.5 V voltage cut-off. After running the battery without beads, cycling and circulation were stopped. A targeted amount of xPS-FcR was added into catholyte reservoir and $[xPS\text{-}bpy\text{-}Me^{2+}][PF_6^-]_2$ was added into anolyte reservoir. After this step, using the same flow rate, galvanostatic charge/discharge cycling was restarted.

Rate of Redox-Exchange Reactions of Functionalized Polymer Beads

To determine the rate of these redox-exchange reactions before using them in a RFB it was necessary to measure the individual concentrations of the same ROM in two different oxidation states (e.g., FcR and $FcR^+$) in a mixed solution-something that CV using a standard disk electrode does not do well. An ultramicroelectrode was used to measure individual concentrations of the same ROM in two different oxidation states (e.g., FcR and $FcR^+$). Such measurement yields CVs of the type shown in FIG. 4B (FcR, $FcR^+$, and a 1:1 mixture of FcR and $FcR^+$) and FIG. 4D (Bn-bpy-$Me^{2+}$, Bn-bpy-$Me^+$, and a 1:1 mixture of Bn-bpy-$Me^{2+}$ and Bn-bpy-$Me^+$). The difference between the current at the oxidative plateau and the current at the reductive plateau in FIG. 4B is proportional to the total concentration of FcR and $FcR^+$ present, with the absolute value of the anodic current proportional to the FcR concentration and the absolute value of the cathodic current proportional to the $FcR^+$ concentration. The direct proportionality of the anodic and cathodic currents to the concentrations of FcR and $FcR^+$, respectively, holds only if FcR and $FcR^+$ have similar diffusion coefficients in the solvent/electrolyte system examined; the equivalence of the anodic and cathodic currents in the CV of a 1:1 solution of FcR and FcR$^+$ in FIG. 4B confirmed this to be the case. That is also true for Bn-bpy-Me$^{2+}$ and Bn-bpy-Me$^+$, as indicated by the CVs in FIG. 4D.

Figure 4A:
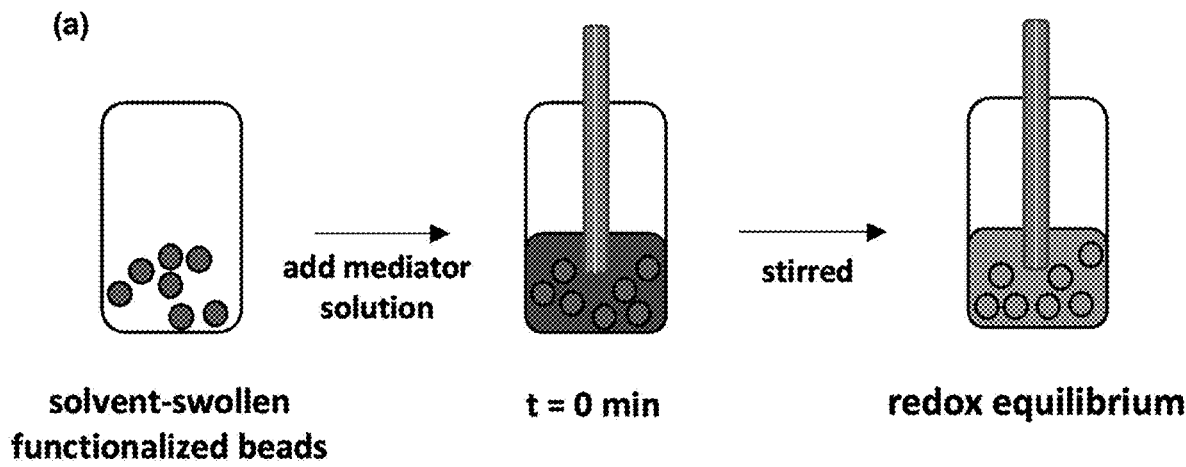
FIG. 4A is a schematic illustration of a set-up for monitoring redox exchange reactions over time using an ultramicroelectrode (Pt disk, 10 μm diameter)
Figure 4B:
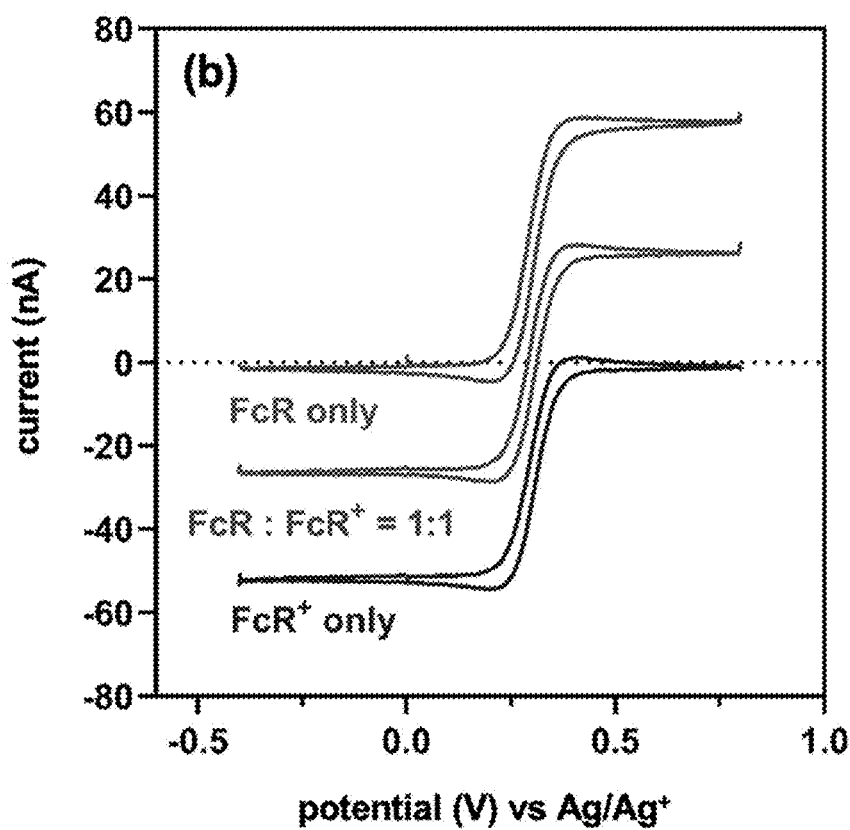
FIG. 4B is a graph showing ultramicroelectrode CVs of 5.0 mM FcR, 5.0 mM $FcR^+$, and 2.5 mM each of FcR and $FcR^+$.
Figure 4C:
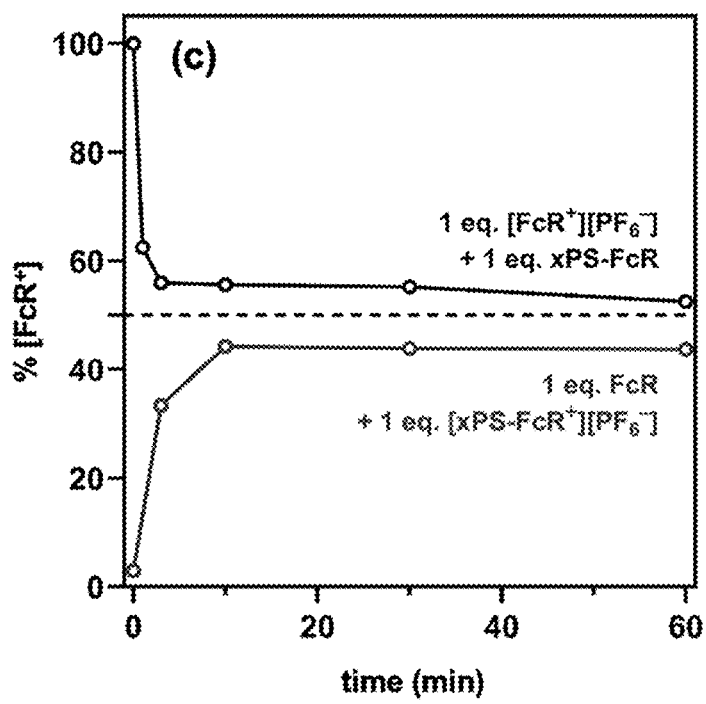
FIG. 4C is a graph showing the change in solution-phase fraction of $FcR^+$ over time as $FcR^+$ interacts with xPS-Fc and FcR interacts with xPS-$Fc^+$.
Figure 4D:
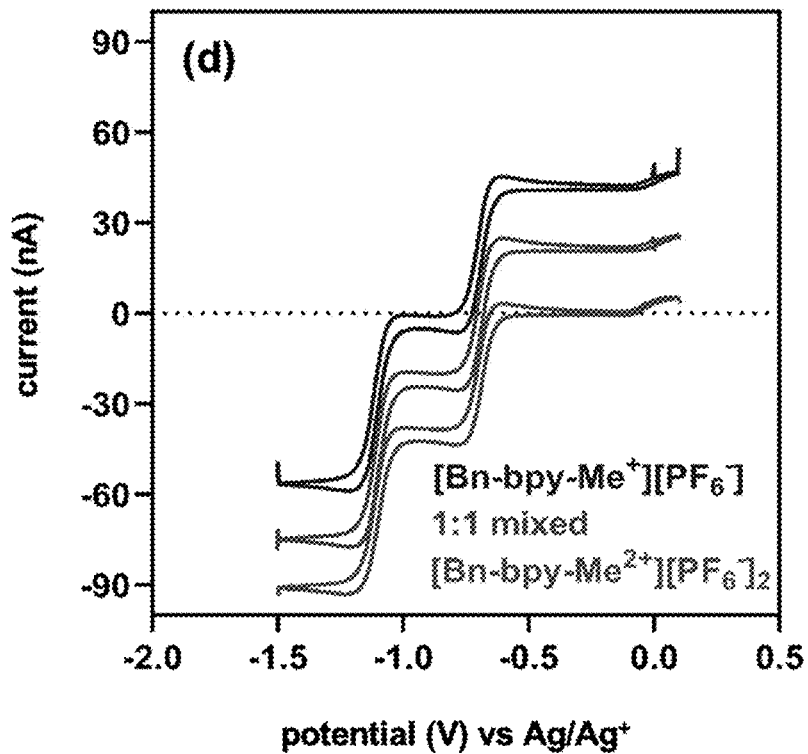
FIG. 4D is a graph showing ultramicroelectrode CVs of 5.0 mM Bn-bpy-$Me^{2+}$, 5.0 mM Bn-bpy-$Me^+$, and 2.5 mM each of Bn-bpy-$Me^{2+}$ and Bn-bpy-$Me^+$.
Figure 4E:
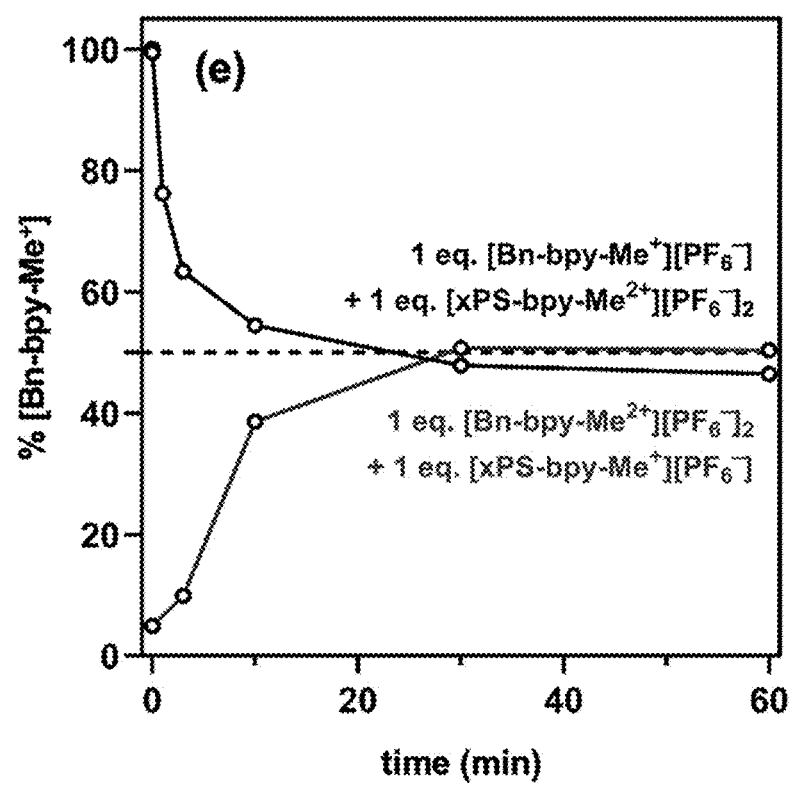
FIG. 4E is a graph showing the change in solution-phase fraction of Bn-bpy-$Me^+$ over time as Bn-bpy-$Me^+$ interacts with xPS-bpy-$Me^{2+}$ and Bn-bpy-$Me^{2+}$ interacts with xPS-bpy-$Me^+$.

The rate of redox equilibration between the beads and dissolved mediators was determined by the procedure shown schematically in FIG. 4A. First, a measured quantity of beads was placed in a vial (in a nitrogen-filled glovebox) with a solution of 0.50 M [NBu4] [PF6] in CH3CN to swell the beads. The excess liquid was decanted after 30 min. To the swollen beads was added a solution of an equivalent molar amount of its redox-matched mediator in the oxidation state opposite that of the redox moieties on the beads, and the change in redox state of the solution-phase species was monitored. For example, for the xPS-Fc beads, a solution containing one equivalent of [FcR$^+$][PF$_6^-$] (relative to the amount of redox-active Fc moieties on the beads) was added, such that at equilibrium there would be a 1:1 mixture of FcR and FcR$^+$ in solution (assuming that the solution-phase FcR and the bead-bound Fc moiety have the same redox potential). The suspension was gently stirred and the stirring paused to obtain CVs with the ultramicroelectrode. In separate experiments, the equilibrium was approached from the other direction; that is, the oxidized form of the ferrocene beads, [xPS-Fc+][PF$_6^-$], and the reduced form of the viologen beads, [xPS-bpy-Me$^+$ ][PF$_6^-$], were prepared, and each was treated with their corresponding redox-matched mediator in the opposite oxidation state. The redox state of the solution mediators were monitored over time by ultramicroelectrode. In all four experiments the solutions came to equilibrium with an approximate 1:1 mixture of oxidized and reduced species in solution, as expected (FIGS. 4C and 4E). As shown in FIG. 4C, the ferrocene systems came to equilibrium quickly, with the oxidation of xPS-Fc near equilibrium in 3 min and the reduction of [xPS-Fc+][PF$_6^-$] near equilibrium in 10 min. The viologen system was slower to equilibrate, reaching near-equilibrium in 10 min and full equilibrium in 30 min, in both the oxidative and reductive redox exchanges. Without intending to be bound by theory, it is believed that the slower equilibration time of the viologen may be due to the larger size of the Bn-Bpy-Me$^{2+/+}$ cation, slowing its diffusion into and out of the crosslinked beads. Separate experiments in flow battery reservoirs, not connected to the electrode cell but simply recirculating the electrolyte, showed a similarly fast redox exchange between the beads and solution-phase mediators (FIG. 17). Overall, these results show that the beads should charge and discharge sufficiently quickly to function in a RMFB, where the charge or discharge times will be at least 60 min (corresponding to a 1C rate).

Crossover Rates of Different Flow Cell Separators

Figure 5:
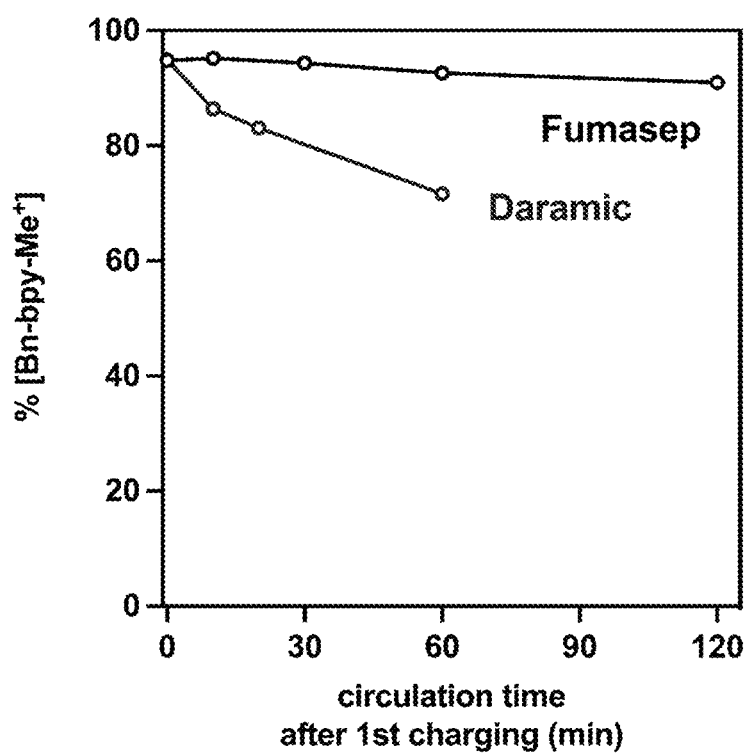
FIG. 5 is a graph showing the change in concentration of [Bn-bpy-$Me^+$][$PF_6^-$] in the anolyte solution after the RFB (with no beads) has been charged and then circulation continued with no electrical charging or discharging, with a Daramic mesoporous membrane and Fumasep anion-exchange membrane as the separator.

Solutions that were 15 mM in both [Bn-bpy-Me$^{2+}$][PF$_6^-$]$_2$ and FcR were placed on both sides of a redox flow battery setup with no polymer beads present. While circulating at 20 mL/min, the battery was charged to 1.40 V (0.36 V greater than the nominal battery voltage). Circulation was stopped and the concentrations of Bn-bpy-Me$^{2+}$ and Bn-bpy-Me$^+$ in the anolyte solution were determined by ultramicroelectrode CV, which indicated that the battery was 95% charged. Circulation was then continued with no potential applied, and the circulation stopped periodically to monitor the decay in Bn-bpy-Me$^+$ concentration and increase in Bn-bpy-Me$^{2+}$ concentration, as shown in FIG. 5. That discharge can be due to either Bn-bpy-Me$^+$ passing through the separator from the anolyte solution to the catholyte solution, or FcR$^+$ passing from the catholyte solution to the anolyte solution and oxidizing Bn-bpy-Me$^+$. With a Daramic 175 separator, the charge of the anolyte solution dropped to 72% after 60 min. That discharge is fast enough that it may lead to incomplete charge/discharge of the polymer beads in a RMFB. A similar experiment was performed under identical conditions except for the use of a Fumasep FAP-375-PP anion-exchange membrane. In that case, as shown in FIG. 5, the discharge due to crossover was significantly slower, with the viologen charge decreasing from 95% to 93% over 60 min and to 91% over 120 min. A Fumasep FAP-375-PP membrane was selected in the following RMFB experiments.

Figure 6A:
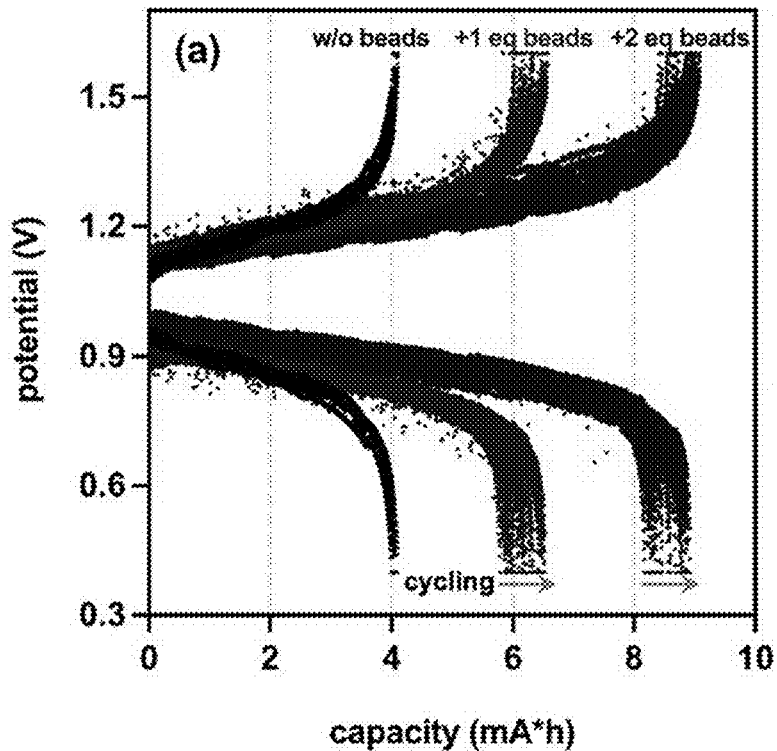
FIG. 6A is a graph of charge-discharge curves for a redox matched flow battery with no beads (black), 1 equiv of beads, and 2 equiv of beads.
Figure 6B:
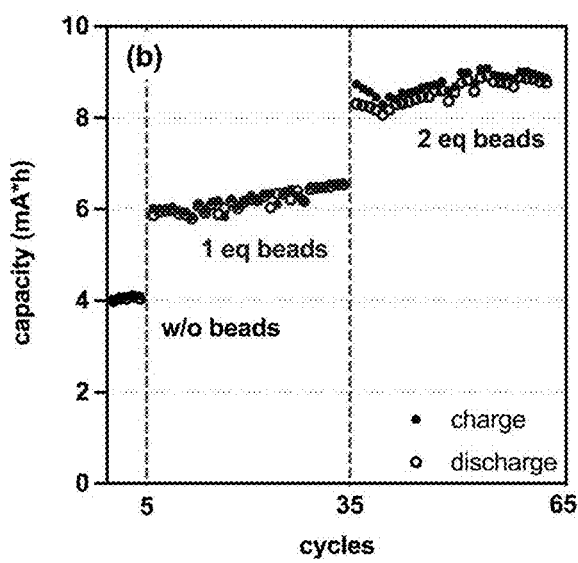
FIG. 6B is a graph showing capacity versus cycle number for each battery setup.
Figure 6C:
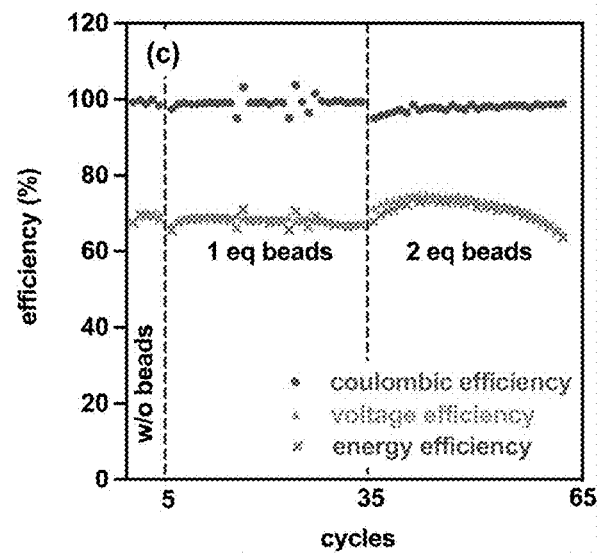
FIG. 6C is a graph showing coulombic, voltaic, and energy efficiencies of each battery.

A flow battery was set up with (12 mL of solution in each reservoir, CH$_3$CN, 0.50 M [NBu$_4$][PF$_6$], 15 mM in both [Bn-bpy-Me$^{2+}$][PF-]$_2$ and FcR) with no beads present. The redox flow battery was charged and discharged galvanostatically at a current of 10 mA to cutoff voltages of 1.40 V (charge) and 0.50 V (discharge). The charge-discharge curves for 8 cycles are shown in FIG. 4a. The theoretical capacity for this cell was 4.82 mAh, and approximately 80% of that capacity was attained with no beads present (FIG. 6B).

Next the xPS-Fc beads were added to the catholyte reservoir and [xPS-bpy-Me$^{2+}$][PF$_6^-$]$_2$ beads were added to the anolyte reservoir. The quantity of beads added to each reservoir contained 0.180 mmol of redox-active moiety, such that the battery capacity would double if the full redox capacity of the beads was utilized. The RMFB was then cycled 10 times, and the charge-discharge curves are shown in FIG. 6A while the capacities are shown in FIG. 6B. After the addition of 1 equiv of beads, the discharge capacity increased to 6.33 mAh (averaged over the next 5 cycles), representing a remarkable 76% increase. When 2 equiv of beads were added, the discharge capacity increased further to 8.03 mAh (averaged over the next 5 cycles), representing a 123% increase over the final cycle without beads. Combined, these data demonstrate that charge can be efficiently stored on insoluble polymer beads and that charging can occur through solution-based mediators with matched redox potentials, highlighting the advantages of the redox match flow batteries of the disclosure. The net 4.43 mAh increase in capacity corresponded to 46% of the theoretical 9.64 mAh capacity contained in those beads.

Materials Preparation Via Bulk Electrolysis

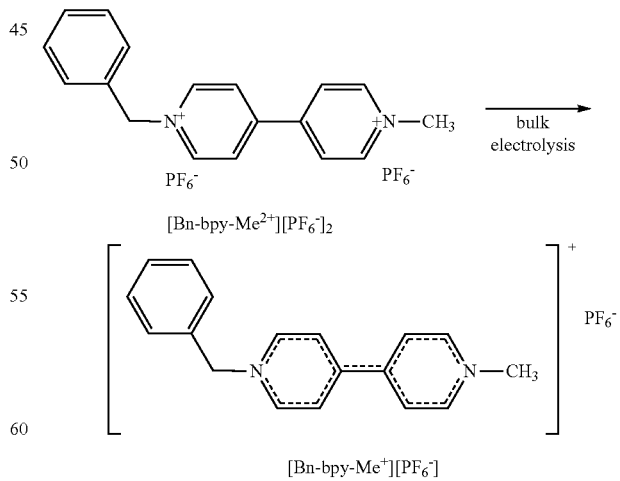

[Bn-bpy-Me$^+$][PF$_6^-$]. Bulk electrolysis was performed in an H-cell with an ultrafine fritted glass separator (P5, Adams and Chittenden). The experiments were performed in 0.50 M TBAPF$_6$ in MeCN with 5.0 mM of [Bn-bpy-Me$^{2+}$][PF$_6^-$]$_2$.

The working and counter electrode were reticulated vitreous carbon 2" long (McMaster 100 PPI, ~0.25 inches diameter), and the reference electrode was Ag wire in 10 mM AgPF$_6$+ 0.50 M TBAPF$_6$ in MeCN in a glass tube separated by a 0.50 mm BASi CoralPore frit. The working chamber was charged against 5 mL of blank solution (0.50 M TBAPF$_6$ in MeCN), and the current was set to −5 mA under a predetermined voltaic cut-off of −1.5 V. When the potential reached the voltaic cut-off, the charging was stopped and the solution in working side was collected.

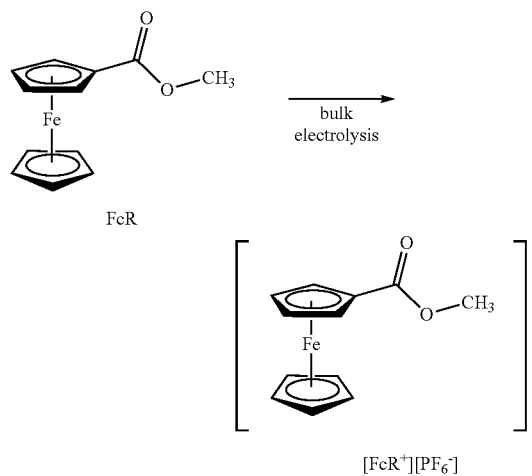

[FcR$^+$][PF$_6^-$]. Bulk electrolysis as described above, except using a 5.0 mM solution of FcR and an oxidative current with a cutoff of +1.5 V.

REFERENCES

1. Kita, R.; Svec, F.; Fréchet, J. M. J. Hydrophilic Polymer Supports for Solid-Phase Synthesis: Preparation of Poly (Ethylene Glycol) Methacrylate Polymer Beads Using "Classical" Suspension Polymerization in Aqueous Medium and Their Application in the Solid-Phase Synthesis of Hydantoins. *J. Comb. Chem.* 2001, 3 (6), 564-571. https://doi.org/10.1021/cc010020c.
2. Wang, Z.; Luo, J.; Zhu, X. X.; Jin, S.; Tomaszewski, M. J. Functionalized Cross-Linked Poly(Vinyl Alcohol) Resins as Reaction Scavengers and as Supports for Solid-Phase Organic Synthesis. *J. Comb. Chem.* 2004, 6 (6), 961-966. https://doi.org/10.1021/cc0499183.
3. Hu, B.; DeBruler, C.; Rhodes, Z.; Liu, T. L. Long-Cycling Aqueous Organic Redox Flow Battery (AORFB) toward Sustainable and Safe Energy Storage. *J. Am. Chem. Soc.* 2017, 139 (3), 1207-1214. https://doi.org/10.1021/jacs.6b10984.
4. Xiao, Y.; Chu, L.; Sanakis, Y.; Liu, P. Revisiting the IspH catalytic system in the deoxyxylulose phosphate pathway: achieving high activity. *J. Am. Chem. Soc.* 2009, 131, 9931-9933.
5. Nchimi-Nono, K.; Dalvand, P.; Wadhwa, K.; Nuryyeva, S.; Alneyadi, S.; Prakasam, T.; Trabolsi, A. Radical-Cation Dimerization Overwhelms Inclusion in [n] Pseudorotaxanes. *Chem. Eur. J.* 2014, 20, 7334-7344
6. Noack, J.; Roznyatovskaya, N.; Herr, T.; Fischer, P. The Chemistry of Redox-Flow Batteries. *Angew. Chem. Int. Ed.* 2015, 54 (34), 9776-9809. https://doi.org/10.1002/anie.201410823.
7. Winsberg, J.; Hagemann, T.; Janoschka, T.; Hager, M. D.; Schubert, U. S. Redox-Flow Batteries: From Metals to Organic Redox-Active Materials. *Angew. Chem. Int. Ed.* 2017, 56 (3), 686-711. https://doi.org/10.1002/anie.201604925.
8. Ue, M.; Ida, K.; Mori, S. Electrochemical Properties of Organic Liquid Electrolytes Based on Quaternary Onium Salts for Electrical Double-Layer Capacitors. *J. Electrochem. Soc.* 1994, 141 (11), 2989. https://doi.org/10.1149/1.2059270.
9. Darling, R. M.; Gallagher, K. G.; Kowalski, J. A.; Ha, S.; Brushett, F. R. Pathways to Low-Cost Electrochemical Energy Storage: A Comparison of Aqueous and Nonaqueous Flow Batteries. *Energy Environ. Sci.* 2014, 7 (11), 3459-3477. https://doi.org/10.1039/C4EE02158D.
10. Yan, Y.; Robinson, S. G.; Sigman, M. S.; Sanford, M. S. Mechanism-Based Design of a High-Potential Catholyte Enables a 3.2 V All-Organic Nonaqueous Redox Flow Battery. *J. Am. Chem. Soc.* 2019, 141 (38), 15301-15306. https://doi.org/10.1021/jacs.9b07345.
11. Yan, Y.; Vaid, T. P.; Sanford, M. S. Bis(Diisopropylamino)Cyclopropenium-Arene Cations as High Oxidation Potential and High Stability Catholytes for Non-Aqueous Redox Flow Batteries. *J. Am. Chem. Soc.* 2020, 142 (41), 17564-17571. https://doi.org/10.1021/jacs.0c07464.
12. Silcox, B.; Zhang, J.; Shkrob, I. A.; Thompson, L.; Zhang, L. On Transferability of Performance Metrics for Redox-Active Molecules. *J. Phys. Chem. C* 2019, 123 (27), 16516-16524. https://doi.org/10.1021/acs.jpcc.9b02230.
13. Xing, X.; Liu, Q.; Xu, W.; Liang, W.; Liu, J.; Wang, B.; Lemmon, J. P. All-Liquid Electroactive Materials for High Energy Density Organic Flow Battery. *ACS Appl. Energy Mater.* 2019, 2 (4), 2364-2369. https://doi.org/10.1021/acsaem.8b01874.
14. Duan, W.; Huang, J.; Kowalski, J. A.; Shkrob, I. A.; Vijayakumar, M.; Walter, E.; Pan, B.; Yang, Z.; Milshtein, J. D.; Li, B.; Liao, C.; Zhang, Z.; Wang, W.; Liu, J.; Moore, J. S.; Brushett, F. R.; Zhang, L.; Wei, X. "Wine-Dark Sea" in an Organic Flow Battery: Storing Negative Charge in 2,1,3-Benzothiadiazole Radicals Leads to Improved Cyclability. *ACS Energy Lett.* 2017, 2 (5), 1156-1161. https://doi.org/10.1021/acsenergylett.7b00261.
15. Vaid, T. P.; Sanford, M. S. An Organic Super-Electron-Donor as a High Energy Density Negative Electrolyte for Nonaqueous Flow Batteries. *Chem. Commun.* 2019, 55 (74), 11037-11040. https://doi.org/10.1039/C9CC06080D.
16. Robinson, S. G.; Yan, Y.; Hendriks, K. H.; Sanford, M. S.; Sigman, M. S. Developing a Predictive Solubility Model for Monomeric and Oligomeric Cyclopropenium-Based Flow Battery Catholytes. *J. Am. Chem. Soc.* 2019, 141 (26), 10171-10176. https://doi.org/10.1021/jacs.9b04270.
17. Zhang, J.; Corman, R. E.; Schuh, J. K.; Ewoldt, R. H.; Shkrob, I. A.; Zhang, L. Solution Properties and Practical Limits of Concentrated Electrolytes for Nonaqueous Redox Flow Batteries. *J. Phys. Chem. C* 2018, 122 (15), 8159-8172. https://doi.org/10.1021/acs.jpcc.8b02009.
18. Zeng, Y. K.; Zhao, T. S.; An, L.; Zhou, X. L.; Wei, L. A Comparative Study of All-Vanadium and Iron-Chromium Redox Flow Batteries for Large-Scale Energy Storage. *J. Power Sources* 2015, 300, 438-443. https://doi.org/10.1016/j.jpowsour.2015.09.100.

19. Potash, R. A.; McKone, J. R.; Conte, S.; Abruña, H. D. On the Benefits of a Symmetric Redox Flow Battery. *J. Electrochem. Soc.* 2016, 163 (3), A338-A344. https://doi.org/10.1149/2.0971602jes.
20. Duan, W.; Vemuri, R. S.; Milshtein, J. D.; Laramie, S.; Dmello, R. D.; Huang, J.; Zhang, L.; Hu, D.; Vijayakumar, M.; Wang, W.; Liu, J.; Darling, R. M.; Thompson, L.; Smith, K.; Moore, J. S.; Brushett, F. R.; Wei, X. A Symmetric Organic-Based Nonaqueous Redox Flow Battery and Its State of Charge Diagnostics by FTIR. *J. Mater. Chem. A* 2016, 4 (15), 5448-5456. https://doi.org/10.1039/C6TA01177B.
21. Moutet, J.; Veleta, J. M.; Gianetti, T. L. Symmetric, Robust, and High-Voltage Organic Redox Flow Battery Model Based on a Helical Carbenium Ion Electrolyte. *ACS Appl. Energy Mater.* 2021, 4 (1), 9-14. https://doi.org/10.1021/acsaem.0c02350.
22. Hendriks, K. H.; Robinson, S. G.; Braten, M. N.; Sevov, C. S.; Helms, B. A.; Sigman, M. S.; Minteer, S. D.; Sanford, M. S. High-Performance Oligomeric Catholytes for Effective Macromolecular Separation in Nonaqueous Redox Flow Batteries. *ACS Cent. Sci.* 2018, 4 (2), 189-196. https://doi.org/10.1021/acscentsci.7b00544.
23. Shrestha, A.; Hendriks, K. H.; Sigman, M. S.; Minteer, S. D.; Sanford, M. S. Realization of an Asymmetric Non-Aqueous Redox Flow Battery through Molecular Design to Minimize Active Species Crossover and Decomposition. *Chem. Eur. J.* 2020, 26 (24), 5369-5373. https://doi.org/10.1002/chem.202000749.
24. Wang, Q.; Zakeeruddin, S. M.; Wang, D.; Exnar, I.; Grätzel, M. Redox Targeting of Insulating Electrode Materials: A New Approach to High-Energy-Density Batteries. *Angew. Chem. Int. Ed.* 2006, 45 (48), 8197-8200. https://doi.org/10.1002/anie.200602891.
25. Ye, J.; Xia, L.; Wu, C.; Ding, M.; Jia, C.; Wang, Q. Redox Targeting-Based Flow Batteries. *J. Phys. D: Appl. Phys.* 2019, 52 (44), 443001. https://doi.org/10.1088/1361-6463/ab3251.
26. Huang, Q.; Li, H.; Grätzel, M.; Wang, Q. Reversible Chemical Delithiation/Lithiation of LiFePO4: Towards a Redox Flow Lithium-Ion Battery. *Phys. Chem. Chem. Phys.* 2013, 15 (6), 1793-1797. https://doi.org/10.1039/C2CP44466F.
27. Jennings, J. R.; Huang, Q.; Wang, Q. Kinetics of LixFePO4 Lithiation/Delithiation by Ferrocene-Based Redox Mediators: An Electrochemical Approach. *J. Phys. Chem. C* 2015, 119 (31), 17522-17528. https://doi.org/10.1021/acs.jpcc.5b03561.
28. Zanzola, E.; Dennison, C. R.; Battistel, A.; Peljo, P.; Vrubel, H.; Amstutz, V.; Girault, H. H. Redox Solid Energy Boosters for Flow Batteries: Polyaniline as a Case Study. *Electrochim. Acta* 2017, 235, 664-671. https://doi.org/10.1016/j.electacta.2017.03.084.
29. Pan, F.; Yang, J.; Huang, Q.; Wang, X.; Huang, H.; Wang, Q. Redox Targeting of Anatase TiO2 for Redox Flow Lithium-Ion Batteries. *Adv. Energy Mater.* 2014, 4 (15), 1400567. https://doi.org/10.1002/aenm.201400567.
30. Yu, J.; Salla, M.; Zhang, H.; Ji, Y.; Zhang, F.; Zhou, M.; Wang, Q. A Robust Anionic Sulfonated Ferrocene Derivative for PH-Neutral Aqueous Flow Battery. *Energy Stor. Mater.* 2020, 29, 216-222. https://doi.org/10.1016/j.ensm.2020.04.020.
31. Zhu, Y. G.; Du, Y.; Jia, C.; Zhou, M.; Fan, L.; Wang, X.; Wang, Q. Unleashing the Power and Energy of LiFePO4-Based Redox Flow Lithium Battery with a Bifunctional Redox Mediator. *J. Am. Chem. Soc.* 2017, 139 (18), 6286-6289. https://doi.org/10.1021/jacs.7b01146.
32. (Jia, C.; Pan, F.; Zhu, Y. G.; Huang, Q.; Lu, L.; Wang, Q. High-Energy Density Nonaqueous All Redox Flow Lithium Battery Enabled with a Polymeric Membrane. *Sci. Adv.* 2015, 1 (10), e1500886. https://doi.org/10.1126/sciadv.1500886.
33. Zhou, M.; Chen, Y.; Salla, M.; Zhang, H.; Wang, X.; Mothe, S. R.; Wang, Q. Single-Molecule Redox-Targeting Reactions for a PH-Neutral Aqueous Organic Redox Flow Battery. *Angew. Chem. Int. Ed.* 2020, 59 (34), 14286-14291. https://doi.org/10.1002/anie.202004603.
34. There is one report of a redox-targeted LiFePO$_4$ electrode is paired with a single soluble mediator that exactly matches the redox potential of the LiFePO$_4$, allowing an electrode with one Nernstian-driven mediator and the construction of a hybrid flow battery: Zhou, M.; Huang, Q.; Pham Truong, T. N.; Ghilane, J.; Zhu, Y. G.; Jia, C.; Yan, R.; Fan, L.; Randriamahazaka, H.; Wang, Q. Nernstian-Potential-Driven Redox-Targeting Reactions of Battery Materials. *Chem* 2017, 3 (6), 1036-1049. https://doi.org/10.1016/j.chempr.2017.10.003.
35. Wong, C. M.; Sevov, C. S. All-Organic Storage Solids and Redox Shuttles for Redox-Targeting Flow Batteries. *ACS Energy Lett.* 2021, 6 (4), 1271-1279. https://doi.org/10.1021/acsenergylett.1c00143.
36. Vaino, A. R.; Janda, K. D. Solid-Phase Organic Synthesis: A Critical Understanding of the Resin. *J. Comb. Chem.* 2000, 2 (6), 579-596. https://doi.org/10.1021/cc0000460.
37. Kowalski, J. A.; Fenton, A. M.; Neyhouse, B. J.; Brushett, F. R. A Method for Evaluating Soluble Redox Couple Stability Using Microelectrode Voltammetry. *J. Electrochem. Soc.* 2020, 167 (16), 160513. https://doi.org/10.1149/1945-7111/abb7e9.
38. Liang, Z.; Attanayake, N. H.; Greco, K. V.; Neyhouse, B. J.; Barton, J. L.; Kaur, A. P.; Eubanks, W. L.; Brushett, F. R.; Landon, J.; Odom, S. A. Comparison of Separators vs Membranes in Nonaqueous Redox Flow Battery Electrolytes Containing Small Molecule Active Materials. *ACS Appl. Energy Mater.* 2021, 4 (6), 5443-5451. https://doi.org/10.1021/acsaem.1c00017.
39. McElvain, S. M.; Vozza, J. F. *J. Am. Chem. Soc.* 1949, 71, 896-900.

What is claimed:

1. A redox-matched flow battery, comprising:
an anolyte reservoir comprising anolyte beads immersed in an electrolyte solution;
a catholyte reservoir comprising catholyte beads immersed in the electrolyte solution;
an electrochemical cell in fluid communication with the anolyte reservoir and the catholyte reservoir, the cell comprising a separator dividing the cell into an anolyte chamber and a catholyte compartment, an anode arranged in the anolyte chamber and a cathode arranged in the catholyte compartment, wherein the anolyte reservoir is in fluid communication with the anolyte compartment to circulate the electrolyte solution as an anolyte solution through the anolyte compartment and the catholyte reservoir is in fluid communication with the catholyte compartment to circulate the electrolyte solution as a catholyte solution through the catholyte compartment,
wherein:
the anolyte beads are polymer beads insoluble in the electrolyte solution functionalized with a negative redox-active moiety, the catholyte beads are polymer beads insoluble in the electrolyte solution functionalized with a positive redox-active moiety, the electrolyte solution comprises a first soluble mediator having a redox potential substantially the same as a redox potential of the negative redox-active moiety, and a second soluble mediator having a redox potential substantially the same as a redox potential of the positive redox-active moiety, in the anolyte reservoir, the first soluble mediator is adapted to undergo redox exchange with the negative redox-active moiety of the anolyte beads while the second soluble mediator remains inactive in the redox exchange;

in the catholyte reservoir, the second soluble mediator is adapted to undergo redox exchange with the positive redox-active moiety while the first soluble mediator remains inactive in the redox exchange, and the catholyte and anolyte beads are adapted to swell in the electrolyte solution.

2. The battery of claim 1, wherein the first soluble mediator and the second soluble mediator are present in the electrolyte solution in a 1:1 molar ratio.

3. The battery of claim 1, wherein the insoluble polymer of one or both of the anolyte beads and the catholyte beads comprises polystyrene.

4. The battery of claim 3, wherein the insoluble polymer is poly(chloromethylstyrene-co-styrene-co-divinylbenzene).

5. The battery of claim 1, wherein the negative redox-active moiety and the first soluble mediator each comprises a viologen.

6. The battery of claim 5, wherein the viologen is [Bn-bpy-Me$^{2+}$][PF$_6^-$]$_2$.

7. The battery of claim 1, wherein the positive redox-active moiety and the second soluble mediator each comprises a ferrocene and/or a cyclopropenium.

8. The battery of claim 7, wherein the ferrocene is Methyl ferrocenecarboxylate.

9. The battery of claim 7, wherein the cyclopropenium is amino cyclopropenium.

10. The battery of claim 1, wherein the anolyte reservoir comprises a porous divider upon which with the anolyte beads are disposed, the porous divider is adapted to prevent the anolyte beads from flowing through the divider, but allow the electrolyte solution to flow there-through, and the electrolyte from a region below the divider is flowed from the anolyte reservoir into the cell and electrolyte collected from the cell is flowed back to into the anolyte reservoir at a region above the divider.

11. The battery of claim 1, wherein the catholyte reservoir comprises a porous divider upon which with the catholyte beads are disposed, the porous divider is adapted to prevent he catholyte beads from flowing through the divider, but allow the electrolyte solution to flow there-through, and the electrolyte from a region below the divider is flowed from the catholyte reservoir into the cell and electrolyte collected from the cell is flowed back to into the catholyte reservoir at a region above the divider.

12. The battery of claim 1, wherein the separator is an ion exchange membrane.

13. The battery of claim 1, wherein the electrolyte comprises 25 mM or less of each of the first and second soluble mediators.

* * * * *